(12) United States Patent
Valentine et al.

(10) Patent No.: US 12,485,508 B2
(45) Date of Patent: Dec. 2, 2025

(54) DEVICES AND TOOLING SYSTEM FOR MAINTENANCE OF DYNAMIC WEIGHT MANAGEMENT SYSTEMS ON RAILROAD VEHICLES

(71) Applicant: BNSF Railway Company, Fort Worth, TX (US)

(72) Inventors: Larry C. Valentine, Berryton, KS (US); Mike E. Teaford, Topeka, KS (US); Timothy Webb, Topeka, KS (US)

(73) Assignee: BNSF Railway Company, Fort Worth, TX (US)

( * ) Notice: Subject to any disclaimer, the term of this patent is extended or adjusted under 35 U.S.C. 154(b) by 426 days.

(21) Appl. No.: 18/045,692

(22) Filed: Oct. 11, 2022

(65) Prior Publication Data

US 2024/0116147 A1     Apr. 11, 2024

(51) Int. Cl.
*B23P 19/027* (2006.01)
*B61F 99/00* (2006.01)

(52) U.S. Cl.
CPC ............ *B23P 19/027* (2013.01); *B61F 99/00* (2013.01)

(58) Field of Classification Search
CPC ........ B23P 19/027; B61F 99/00; B61C 15/04; B25B 27/064; B25B 27/026
See application file for complete search history.

(56) References Cited

U.S. PATENT DOCUMENTS

| | | | |
|---|---|---|---|
| 3,820,220 A | 6/1974 | West | |
| 5,042,132 A | 8/1991 | Hardin | |
| 5,333,378 A * | 8/1994 | Sjoborn | B25B 27/064 29/259 |
| 5,729,881 A | 3/1998 | Kent et al. | |
| 6,305,061 B1 * | 10/2001 | King | B25B 27/023 29/259 |

(Continued)

FOREIGN PATENT DOCUMENTS

| | | |
|---|---|---|
| CN | 2666619 Y | 12/2004 |
| CN | 207971866 U | 10/2018 |
| CN | 113580059 A | 11/2021 |

OTHER PUBLICATIONS

International Preliminary Report on Patentability issued in PCT/US2023/076432 by the International Bureau dated Apr. 15, 2025; 7 pages.

*Primary Examiner* — Seahee Hong
(74) *Attorney, Agent, or Firm* — Whitaker Chalk Swindle & Schwartz PLLC; Enrique Sanchez, Jr.

(57) ABSTRACT

Devices and/or tooling systems for performing maintenance of dynamic weight management (DWM) systems on railroad vehicles are provided. In embodiments, the devices may include specialized devices or tools configured for removing and/or installing various DWM components. In embodiments, the removal/installation devices may include a DWM cover plate removal device, a DWM crank and shaft removal device, and/or a DWM bushing maintenance device. In embodiments, the DWM cover plate removal device may be configured to remove a cover plate of a DWM system attached to a frame of a truck assembly of a railroad vehicle, the DWM crank and shaft removal device may be configured to remove a DWM main shaft and/or a DWM chain crank from a DWM system, and the DWM bushing maintenance device may be configured to install and/or remove a frame bushing from and/or into a frame bushing opening within a frame of a DWM system.

14 Claims, 24 Drawing Sheets

(56) References Cited

U.S. PATENT DOCUMENTS

| | | | |
|---|---|---|---|
| 6,502,293 B1* | 1/2003 | Khurana | F01L 1/46 |
| | | | 29/260 |
| 7,770,277 B2* | 8/2010 | Wridt | B25B 27/023 |
| | | | 29/261 |
| 7,996,972 B2* | 8/2011 | Hu | B25B 27/026 |
| | | | 29/259 |
| 8,418,626 B2 | 4/2013 | Gorski et al. | |
| 8,443,735 B2 | 5/2013 | Kumar et al. | |
| 8,484,842 B2 | 7/2013 | Dickerson et al. | |
| 8,528,176 B2 | 9/2013 | Macchia et al. | |
| 9,120,215 B2 | 9/2015 | Muenchrath et al. | |
| 9,981,368 B2 | 5/2018 | Zeren et al. | |
| 11,370,465 B2 | 6/2022 | Zhang et al. | |
| 11,459,002 B2 | 10/2022 | Zhang et al. | |
| 2006/0085964 A1 | 4/2006 | Brown | |

* cited by examiner

1200

1202
Mount a DWM system cover plate removal device onto a DWM cover plate of a DWM system of a railroad vehicle

1204
Activate the DWM system cover plate removal device to cause the DWM cover plate to separate from a frame of a truck assembly onto which the DWM system is installed

1302
Mount a DWM crank and shaft removal device onto a frame of a truck assembly of railroad vehicle in which a DWM system is installed

1304
Activate the DWM crank and shaft removal device to cause a DWM main shaft and/or a DWM chain crank to be pulled from the frame of the truck assembly

1402
Mount a DWM bushing maintenance device onto a frame of a truck assembly of a railroad vehicle in which a DWM system is installed

1404
Activate the DWM bushing maintenance device to cause a frame bushing to be removed from a frame bushing opening within the frame of the truck assembly

1452 ⇾
Mount a DWM bushing maintenance device onto a frame of a truck assembly of a railroad vehicle in which a DWM system is installed 1454 ⇾
Activate the DWM bushing maintenance device to cause a frame bushing to be pushed into a frame bushing opening within the frame of the truck assembly

1502 ⇾
Form a base having one or more key openings configured to receive one or more keys to secure the base to a cover plate of a DWM system attached to a frame of a truck assembly of a railroad vehicle, and defining a central opening configured to align with a main shaft of the DWM system 1504 ⇾
Couple an actuator to the base, wherein the actuator is configured to provide a driving force 1506 ⇾
Form one or more keys configured to be inserted into the one or more key openings of the base 1508 ⇾
Form one or more mandrils, the one or more mandrils configured to be disposed within the central opening of the base, to contact, at a distal end of the one or more mandrils, the main shaft of the DWM system, and to receive, at a proximal end of the one or more mandrils, the driving force from the actuator

FIG. 15

DEVICES AND TOOLING SYSTEM FOR MAINTENANCE OF DYNAMIC WEIGHT MANAGEMENT SYSTEMS ON RAILROAD VEHICLES

TECHNICAL FIELD

The present disclosure relates generally to maintenance tools, and more particularly to devices and tooling systems for maintenance of dynamic weight management (DWM) systems on railroad vehicles.

BACKGROUND

Trains allow us to move large amounts of materials, objects, and/or persons for long distances for a relatively cheap price. A typical train includes a locomotive engine vehicle providing power to move train cars attached thereto over a railroad track. A typical railroad vehicle may include a main body that sits atop one or more truck assembly. A truck assembly may include various components that enable a train car to travel over a railroad track. For example, a typical truck assembly may include multiple axle assemblies to which wheels may be attached to allow the locomotive to roll over the railroad track. A typical configuration may consist of three axle assemblies per truck assembly, and two truck assemblies (e.g., a front truck assembly and a rear truck assembly) per railroad vehicle.

In some implementations, at least one of the axle assemblies of a truck assemblies may be include a dynamic weight management (DWM) system that may operate to dynamically manage a distribution of vehicle weight between the axle assemblies of the truck assembly by adjusting an amount of force exerted by the DWM system. DWM systems may increase the performance of a railroad vehicle by providing a mechanism to control the changes in weight distribution and/or power.

However, maintaining DWM systems has proven to be challenging. For example, maintenance on the various components of a DWM system can be tedious, difficult, and, in some cases, even somewhat dangerous. This is because removing and installing the various components of the DWM system can be difficult, especially when the DWM system components may be defective (e.g., due to wear or defects) or may bound within the system.

Currently, there are no specialized tools for performing maintenance on a DWM system. For example, there are no specialized tools for removing and/or installing the various components of a DWM system. Consequently, workers conducting maintenance a DWM system remove and/or install the various components manually, without the aid of specialized tools or tooling systems.

SUMMARY

The present disclosure achieves technical advantages as devices and/or tooling systems for performing maintenance of dynamic weight management (DWM) systems on railroad vehicles. In embodiments, the devices and/or tooling systems may include specialized devices or tools configured for removing and/or installing various DWM components. In some embodiments, the removal/installation devices may include a DWM cover plate removal device, a DWM crank and shaft removal device, and/or a DWM bushing maintenance device. In embodiments, the DWM cover plate removal device may be configured to remove a cover plate of a DWM system attached to a frame of a truck assembly of a railroad vehicle, the DWM crank and shaft removal device may be configured to remove a DWM main shaft and/or a DWM chain crank from a DWM system, and the DWM bushing maintenance device may be configured to install and/or remove a frame bushing from and/or into a frame bushing opening within a frame of a DWM system.

In one particular embodiment, a DWM cover plate removal device is provided. The DWM cover plate removal device may include an actuator configured to provide a driving force. In some embodiments, the actuator may include one or more of a hydraulic ram, a pneumatic actuator, an electromechanical actuator, and an electromagnetic actuator. In embodiments, the DWM cover plate removal device may include a base coupled to the actuator. The base may have one or more key openings configured to receive one or more keys to secure the base to the cover plate attached to the frame of the truck assembly. In embodiments, the base may have a central opening configured to align with a main shaft of the DWM system running through an opening of the cover plate. In embodiments, the DWM cover plate removal device may include at least one mandril disposed within the central opening of the base. The at least one mandril may have a distal end configured to contact the main shaft of the DWM system, and a proximal end configured to receive the driving force from the actuator. In embodiments, the driving force from the actuator may cause the at least one mandril to push against the main shaft of the DWM system in a first direction and may cause the base to pull from the main shaft of the DWM system in a second direction opposite the first direction causing the cover plate to separate from the frame of the truck assembly.

In another embodiment, a DWM crank and shaft removal device is provided. The DWM crank and shaft removal device may include an actuator configured to provide a pulling force. In some embodiments, the actuator may include one or more of a hydraulic ram, a pneumatic actuator, an electromechanical actuator, and an electromagnetic actuator. In embodiments, the DWM crank and shaft removal device may include a base coupled to the actuator. In embodiments, the base may have a proximal end that may be coupled to the actuator and a distal end that may be configured to attach to a frame of a DWM system. In embodiments, the DWM crank and shaft removal device may include a puller configured to securely attach to a main shaft of the DWM system at a distal end, and to operably connect to the actuator at a proximal end. In embodiments, the puller may be configured to receive the pulling force from the actuator, which may cause the puller to pull the main shaft of the DWM system in a first direction away from the frame of the DWM system causing the main shaft of the DWM system to be removed from the DWM system.

In yet another embodiment, a DWM bushing maintenance device is provided. The DWM bushing maintenance device may include an actuator configured to provide a pushing force. In some embodiments, the actuator may include one or more of a hydraulic ram, a pneumatic actuator, an electromechanical actuator, and an electromagnetic actuator. In embodiments, the DWM bushing maintenance device may include a base coupled to the actuator. In embodiments, the base may have one or more openings configured to receive one or more fasteners to secure the base to a frame of a DWM system of a truck assembly of a railroad vehicle. In embodiments, the base may define a central opening configured to allow a push driver to extend therethrough, and the push driver may have a proximal end operably coupled to the actuator to receive the pushing force from the actuator. In embodiments, the DWM bushing maintenance device may have a mandril with a proximal end configured to connect to a distal end of the push driver and a distal end configured to push a frame bushing through a frame bushing opening within the frame of the DWM system. In embodiments, the mandril may configured to receive the pushing force from the push driver, which may cause the mandril to push the frame bushing through the frame bushing opening within the frame of the DWM system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 12 shows a high-level flow diagram of operation of a DWM system cover plate removal device configured in accordance with embodiments of the present disclosure for removing a DWM cover plate from a frame of a truck assembly.

FIG. 13 shows a high-level flow diagram of operation of a DWM crank and shaft removal device configured in accordance with embodiments of the present disclosure for removing a DWM main shaft and/or a DWM chain crank from a DWM system installed in a truck assembly of a railroad vehicle.

FIG. 14A shows a high-level flow diagram of operation of a DWM bushing maintenance device configured in accordance with embodiments of the present disclosure for removing a frame bushing from a frame of a DWM system installed in a truck assembly of a railroad vehicle.

FIG. 14B shows a high-level flow diagram of operation of a DWM bushing maintenance device configured in accordance with embodiments of the present disclosure for installing a frame bushing into a frame of a DWM system installed in a truck assembly of a railroad vehicle.

FIG. 15 shows an exemplary flow diagram of operations for manufacturing a DWM system cover plate removal device configured with functionality for removing a DWM cover plate from a frame of a truck assembly in accordance with embodiments of the present disclosure.

Figure 1A:
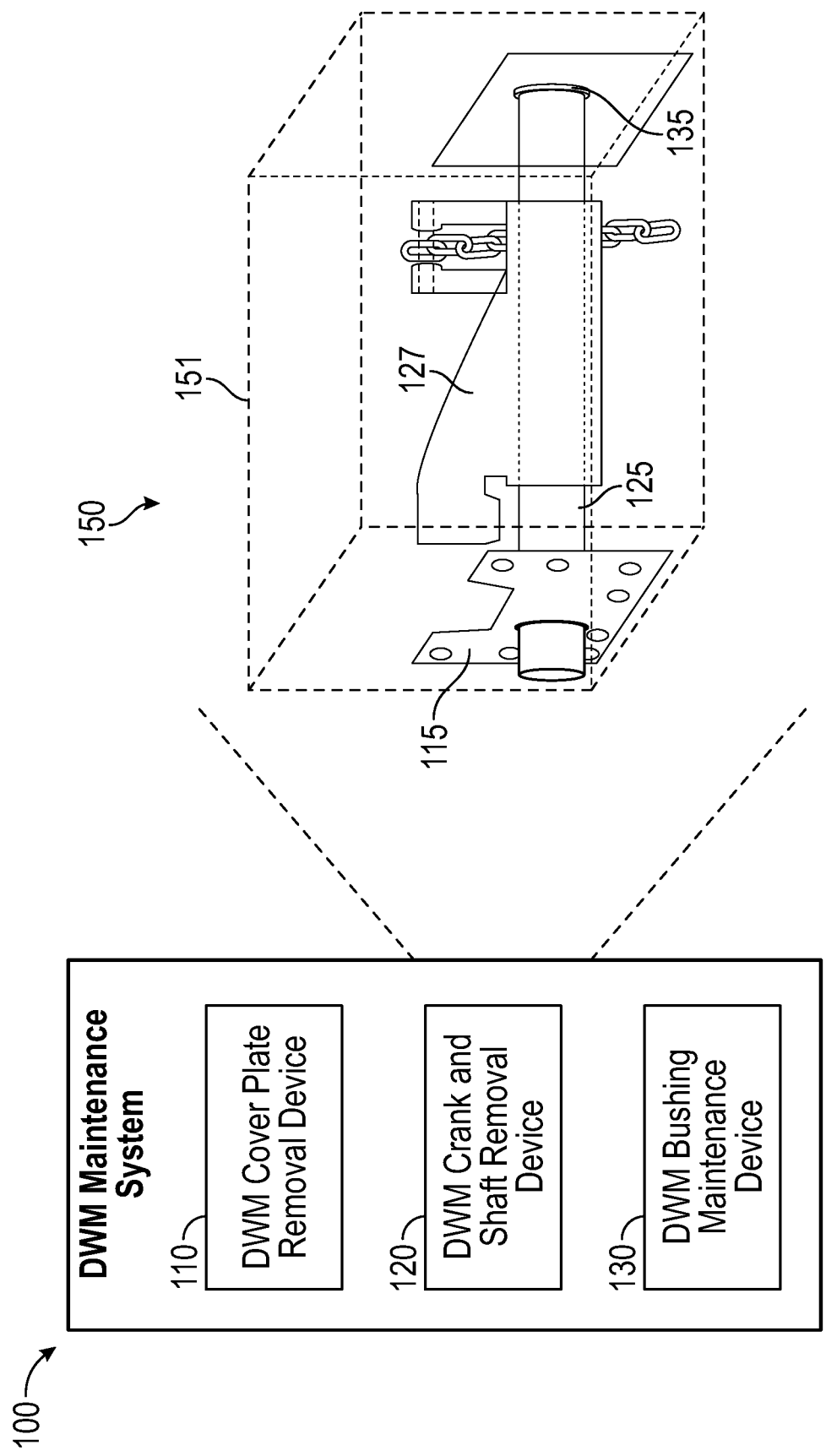
FIG. 1A shows an exemplary dynamic weight management (DWM) maintenance system configured with capabilities and functionality for performing maintenance of DWM systems on railroad vehicles in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to devices and/or tooling systems for performing maintenance of dynamic weight management (DWM) systems on railroad vehicles, and/or methods of manufacturing and/or using devices and/or tooling systems that include functionality to perform maintenance of DWM systems on railroad vehicles. In particular embodiments, the devices and/or tooling systems may include specialized devices or tools configured for removing and/or installing various DWM components. In some embodiments, the removal/installation devices may include a DWM cover plate removal tool, a DWM crank and shaft removal tool, and/or a DWM bushing maintenance tool.

FIG. 1A shows an exemplary DWM maintenance system 100 configured with capabilities and functionality for performing maintenance of DWM systems on railroad vehicles in accordance with embodiments of the present disclosure. As shown in FIG. 1A, DWM maintenance system 100 may include DWM cover plate removal tool 110, DWM crank and shaft removal tool 120, and DWM bushing maintenance tool 130. In embodiments, the components of DWM maintenance system 100 may be configured to include various components and/or configurations for providing functionality as described in various embodiments of the present disclosure. In embodiments, each of DWM cover plate removal device 110, DWM crank and shaft removal device 120, and DWM bushing maintenance device 130 may represent individual devices or tools configured to perform particular maintenance, such as removal and/or installation of particular components of a DWM system as described herein. As will be appreciated, DWM maintenance system 100, and/or the individual devices of DWM maintenance system 100, may provide specialized tools for performing maintenance on a DWM system, and in particular for removing and/or installing various components of a DWM system, which are currently lacking. As such, the devices and systems described herein represent a significant improvement in the field of railroad vehicle maintenance.

As shown in FIG. 1A, DWM system 150 may include various components. For example, DWM main shaft 125 may be attached to DWM chain crank 127. One end of DWM main shaft 125 may be attached to frame 151 via frame bushing 135, which may be installed onto frame 151. The other end of DWM main shaft 125 may extend through an opening of DWM cover plate 115, which may provide support for DWM main shaft 125. DWM cover plate 115 may be attached to frame 151 (e.g., using bolts or screws). In embodiments, DWM cover plate removal device 110 may be configured to remove a DWM cover plate, such as DWM cover plate 115, from frame 151, DWM crank and shaft removal device 120 may be configured to remove a DWM main shaft and/or a DWM chain crank, such as DWM main shaft 125 and/or DWM chain crank 127, and/or DWM bushing maintenance device 130 may be configured to install and/or remove a frame bushing 135, such as frame bushing 135, from frame 151.

Figure 1B:
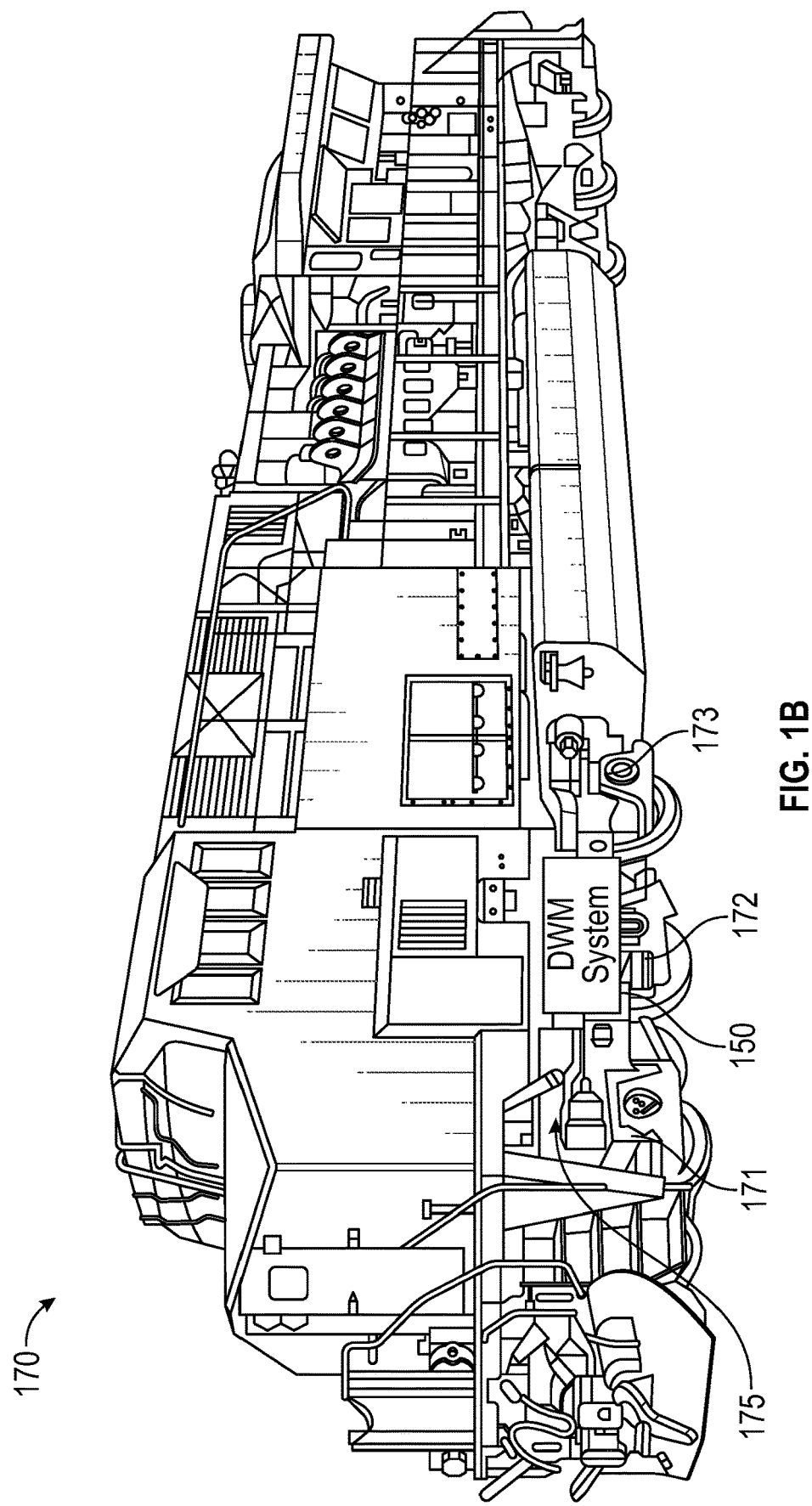
FIG. 1B shows an example of a typical installation of a DWM system in a railroad vehicle.
Figure 1C:
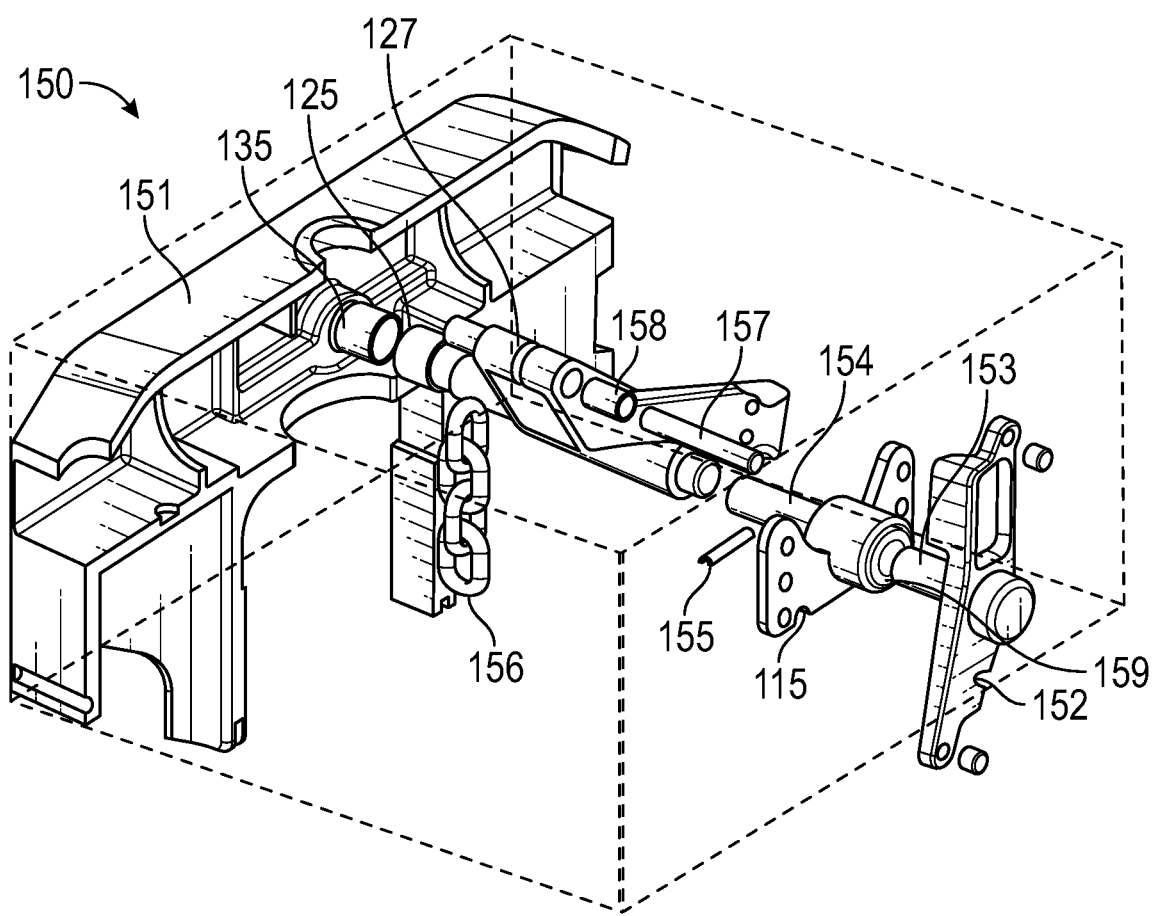
FIG. 1C shows an example of a structure of a DWM system.

To illustrate the functionality, operation, and structure of DWM system 150 and the various components of DWM system 125, a description of DWM system 150 now follows with reference to FIGS. 1B and 1C. FIG. 1B shows an example of a typical installation of a DWM system in a railroad vehicle. For example, as shown in FIG. 1B, railroad vehicle 170 may include two truck assemblies, a front truck assembly and rear truck assembly. Front truck assembly 175 may include three axle assemblies 171-173. In particular, axle assembly 172, which may be in the middle position between truck assemblies 171 and 173, may be configured with DWM system 150. In this case, DWM system 150 may be installed in axle assembly 172 and may operate to dynamically manage a distribution of vehicle weight between axle assemblies 171-173.

FIG. 1C shows an example of a structure of a DWM system. In particular, DWM system 150 may be installed within the frame of a truck assembly, such as frame 151 of truck assembly 172 of railroad vehicle 170. DWM system 150 may include DWM main shaft 125, which may be configured to allow DWM chain crank 127 to rotate. For example, one end of DWM main shaft 125 may be inserted into frame bushing 135, and the other end of DWM main shaft 125 may be inserted through opening 159 (and through DWM chain crank bearing 154) of DWM cover plate 115. In this manner, DWM main shaft 125 may be supported by frame bushing 135 and DWM cover plate 115, while allowing DWM main shaft 125 to rotate about its longitudinal axis. DWM chain crank 127 may be attached to DWM main shaft 125, such that DWM main shaft 125 may be inserted through DWM chain crank 127. In this manner, DWM chain crank 127 may be allowed to rotate about DWM main shaft 125. DWM chain crank 127 may also include one or more DWM chain crank bushings 158 attached to a chain arm through which DWM chain crank pin 157 may be inserted.

DWM chain crank pin 157 may provide a point to which DWM chain 156 may be attached. In this manner, as DWM chain crank 127 rotates, DWM chain 156 may be pulled, thereby providing weight relief. In this implementation of DWM system 150, DWM chain crank 127 may be attached to T-Bar 152, while T-Bar 152 may include a center shaft that is configured to slide through T-Bar bearing 153 installed within opening 159 of DWM cover plate 115. In this manner, T-Bar 152 may be allowed to rotate about the opening 159 of DWM cover plate 115. As T-Bar 152 rotates about opening 159 of DWM cover plate 115, the rotation of T-Bar 152 may cause DWM chain crank 127 to rotate, which may in turn cause DWM chain 156 may be pulled, thereby providing a lifting mechanism that may be used to distribute weight.

With reference back to FIG. 1A, DWM cover plate removal device 110 may be configured to remove DWM cover plate 115 from frame 151. As noted above, frame 151 may be a frame of a truck within which DWM system 150 may be installed. In some cases, removing DWM cover plate 115 from frame 151 may present difficulties, as often, DWM cover plate 115 may become "stuck" to frame 151. In some instances, DWM cover plate 115 may become "stuck" to DWM main shaft 125. For example, as noted above, and with reference to FIG. 1C, DWM cover plate 115 may be attached to DWM main shaft 125 by inserting DWM main shaft 125 through opening 159 of DWM cover plate 115. In some cases, the connection point between DWM cover plate 115 and DWM main shaft 125 may be so tight (e.g., due to rust, debris, etc.) as to make removal of DWM cover plate 115 difficult. In these cases, DWM cover plate removal device 110 may be used to remove DWM cover plate 115 from frame 115.

Figure 2A:
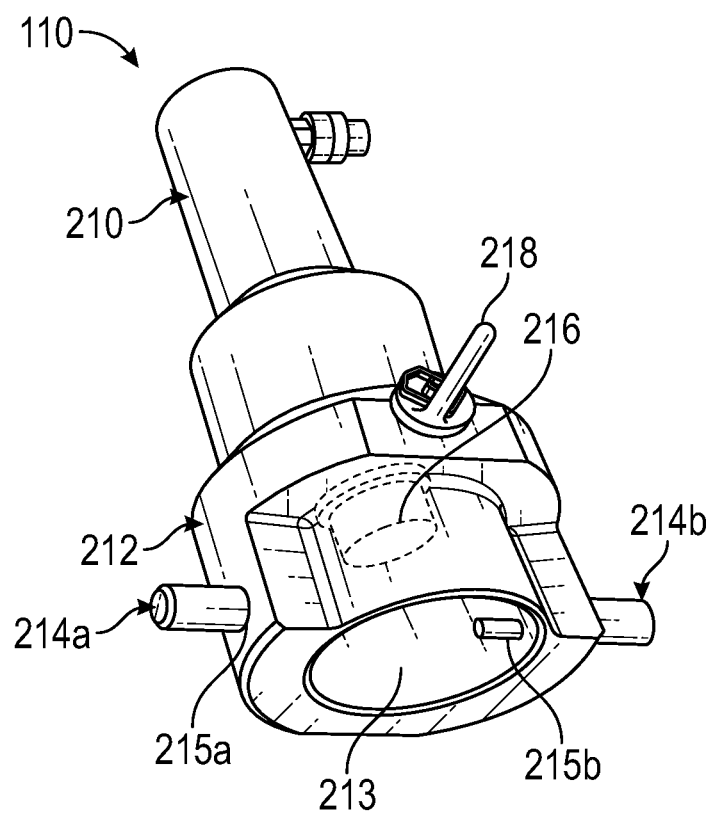
FIG. 2A shows an example of a DWM cover plate removal device implemented in accordance with embodiments of the present disclosure.

FIG. 2A shows an example of DWM cover plate removal device 110 implemented in accordance with embodiments of the present disclosure. For example, DWM cover plate removal device 110 may be configured to remove DMV cover plate 115 from frame 151, as illustrated in FIGS. 1A and 1C. As shown in FIG. 2A, DWM cover plate removal device 110 may include actuator 210, base 212, mandrel 216, and one or more keys 214a and 214b. In embodiments, actuator 210 may be configured to provide an extending driving force. The extending driving force may include a pushing force created by the extension of a driver shaft. In embodiments, the extending driving force may include a contracting pulling force created by the contraction of a driver shaft. For example, actuator 210 may include one or more of a hydraulic ram, a pneumatic actuator, an electromechanical actuator, an electromagnetic actuator, and/or any other component or device configured to provide an extending driving force.

In embodiments, base 212 may be coupled to actuator 210. For example, base 212 may be coupled to actuator 210 by providing threads in base 210 into which actuator 210 may be screwed. In some embodiments, base 212 may be coupled to actuator 210 using adhesives, soldering, welding, straps, screws, bolts, and/or any other mechanisms suitable for fastening base 212 to actuator 210. In embodiments, base 212 may be constructed of strong and/or sturdy materials, such as steel, or stronger materials. For example, in some embodiments, base 212 may be constructed of 1045 steel.

In embodiments, base 212 may include one or more key openings (e.g., key openings 215a and 215b) configured to receive one or more keys (e.g., keys 214a and 214b). In embodiments, each of key openings 215a and 215b may allow one of keys 214a and 214b to be inserted therethrough. The ends of keys 214a and 214b inserted into each of key openings 215a and 215b may protrude through each of key openings 215a and 215b. During operation, keys 214a and 214b may be inserted through each of key openings 215a and 215b such that keys 214a and 214b may go through each of key openings 215a and 215b into an opening of a DWM cover plate (e.g., DWM cover plate 115) to be removed. In this manner, the cooperative functionality of key openings 215a and 215b and keys 214a and 214b may operate to secure base 121 to DMV cover plate 115 to be removed.

In embodiments, keys 214a and 214b may be configured to be inserted into one or more key openings (e.g., key openings 215a and 215b) and to provide secured attachment of base 212 to DWM cover plate 115. In embodiments, such as during operation, keys 214a and 214b may provide a mechanism to pull DWM cover plate 115 away from frame 151 (e.g., by sliding over DWM main shaft 125) in response to a driving force from actuator 210. In embodiments, each of keys 214a and 214b may include two sections, an external section and an inner section. The internal section may be configured to penetrate a key opening, while the external section may be configured to abut against base 212 when the key is inserted into a key opening. In this manner, the external section may prevent a key from being fully inserted into the key opening. In some embodiments, the external section may have a round cross-section, and the inner section may have an obround cross-section. In embodiments, keys 214a and 214b may be constructed of strong and/or sturdy materials, such as steel, or stronger materials. For example, in some embodiments, base 212 may be constructed of heat-treated steel, which may provide sufficient strength to prevent keys 214a and 214b from shearing or breaking during operation (e.g., when pulling DWM cover plate 115 away from frame 151).

In embodiments, base 212 may define a central opening 213. Central opening 213 may be configured to be positioned around a protruding bushing channel of DWM cover plate 115. For example, with reference to FIG. 1C, in some implementations of DWM system 150, opening 159 of DWM cover plate 115 may be provided as a protruding bushing channel through which DWM main shaft 135 may be inserted. In some embodiments, and with reference back to FIG. 2A, central opening 213 of base 212 may be configured to be receive the protruding bushing channel of DWM cover plate 115, such that central opening 213 of base 212 may surround the protruding bushing channel of DWM cover plate 115. In some embodiments, the protruding bushing channel of DWM cover plate 115 may have one or more openings into which keys 214a and 214b may be inserted during operation. For example, keys 214a and 214b may be inserted through each of key openings 215a and 215b such that each of keys 214a and 214b may go through one of key openings 215a and 215b into a respective one of the one or more openings of the protruding bushing channel of DWM cover plate 115.

In embodiments, central opening 213 of base 212 may be configured to align with DWM main shaft 125 of DWM system 150. For example, central opening 213 may be configured to allow DWM main shaft 125 to be positioned approximately centered with central opening 213 when base 212 is attached to DWM cover plate 115. In this manner, as described below, DWM main shaft 125 may be aligned with mandrel 216 such that mandrel 216 may push against DWM main shaft 125 during operation.

In embodiments, mandrel 216 may be configured to transfer the extending driving force from actuator 210 onto DWM main shaft 125 in order to push against DWM main shaft 125. The pushing action against DWM main shaft 125 may cause a counter-action that may pull base 212 away from frame 151, causing DWM cover plate 115, which may be attached to base 212, to separate from frame 151. For example, mandril 216 may include a shaft configured to be disposed within central opening 213. A proximal end of at least one mandril 216 may contact the driver shaft of actuator 210 and may be configured to receive the extending driving force from actuator 210. A distal end of mandril 216 may be configured to contact DWM main shaft 125. In this manner, as the driver shaft of actuator 210 is extended by actuator 210 toward DWM main shaft 125, the driver shaft of actuator 210 may push against the proximal end of mandril 216 and may cause the distal end of mandril 216 to push against DWM main shaft 125, which may cause the counter-action that may pull base 212 away from frame 151 causing DWM cover plate 115 to separate from frame 151.

Figure 2B:
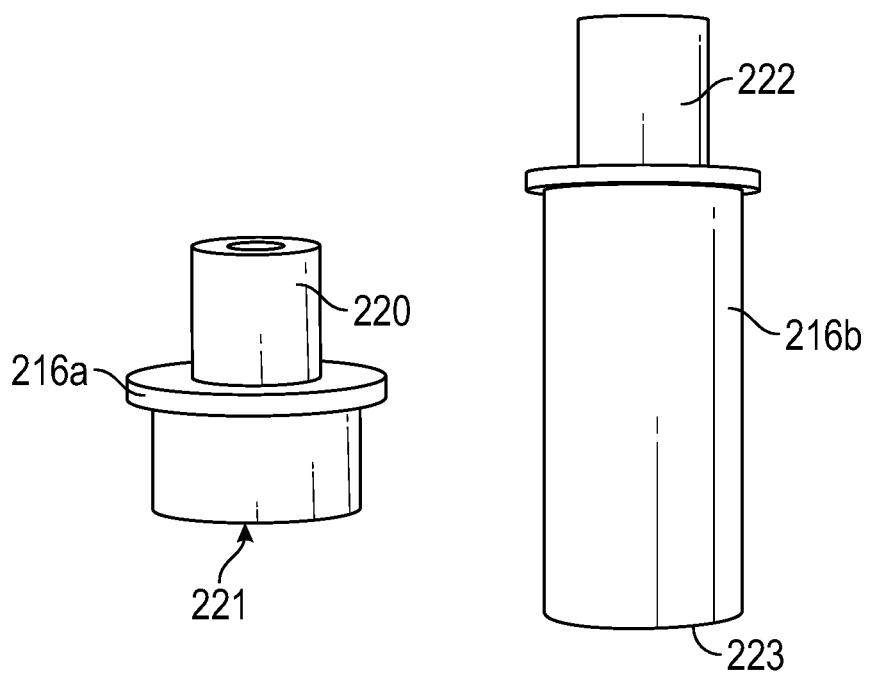
FIG. 2B shows an example of two mandrils configured in accordance with embodiments of the present disclosure.

In some embodiments, mandril 216 may include more than one mandril. FIG. 2B shows an example of two mandrils 216a and 216b configured in accordance with embodiments of the present disclosure. As shown in FIG. 2B, mandril 216a may be configured with a shorter length than the length of mandril 216b. In embodiments, the length of mandril 216a may be sufficient to remove DWM cover plate 115 from frame 115 in most circumstances. For example, in most circumstances, mandril 216a may allow DWM cover plate 115 to slide through DWM main shaft 125 some distance, which may be sufficient to "loosen" DWM cover plate 115 from DWM main shaft 125 and allow for manual removal (e.g., by hand) of DWM cover plate 115. Proximal end 220 of mandril 216a may be configured to connect, couple, or otherwise contact the driver shaft of actuator 210. Distal end 221 of mandril 216a may be configured to connect, couple, or otherwise contact the DWM main shaft 125.

In embodiments, mandril 216b may be configured with a larger length than the length of mandril 216a. In embodiments, the length of mandril 216b may allow DWM cover plate removal device 110 to remove a DWM cover plate when removal using mandril 216a may not be sufficient to "loosen" DWM cover plate 115 from DWM main shaft 125 and allow for manual removal of DWM cover plate 115. In these cases, the longer length of mandril 216b may allow DWM cover plate 115 to "travel" longer through DWM main shaft 125 and separate completely from DWM main shaft 125. Proximal end 221 of mandril 216b may be configured to connect, couple, or otherwise contact the driver shaft of actuator 210. Distal end 223 of mandril 216a may be configured to connect, couple, or otherwise contact the DWM main shaft 125

With reference back to FIG. 2A, in some embodiments, base 212 may include lifting element 218. Lifting element 218 may be configured to allow or facilitate lifting (e.g., using a powered lifting mechanism) of DWM system cover plate removal device 110 during operation. In some embodiments, lifting element 218 may include an eyelet, a ring, a hook, and/or any other mechanism suitable to attach to base 212 and to allow lifting of DWM system cover plate removal device 110.

Figure 3A:
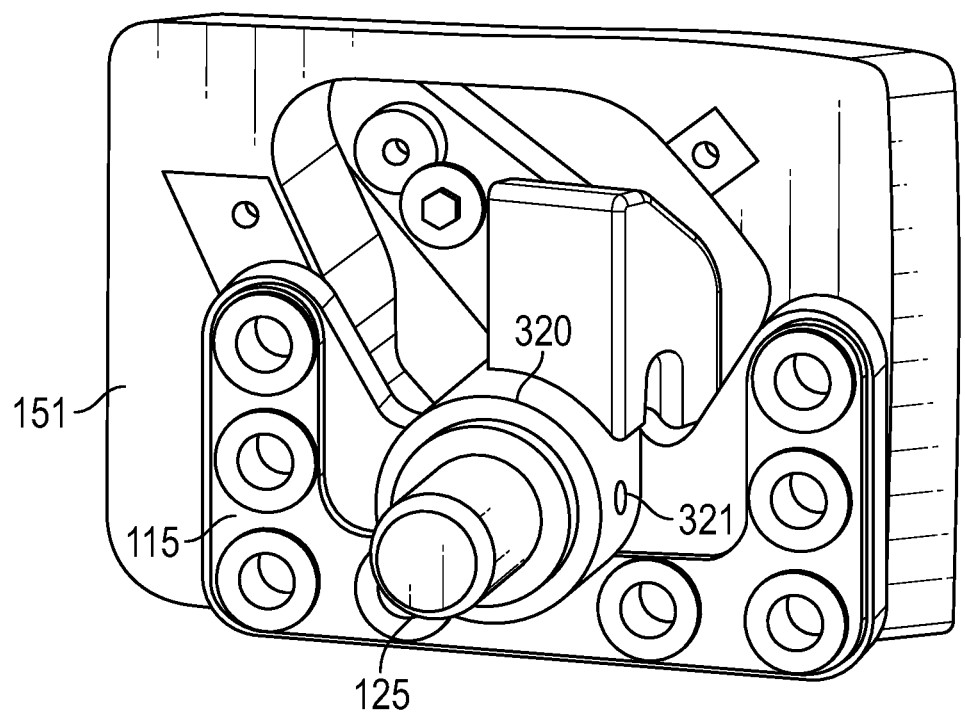
FIGS. 3A-3C show different views of a DWM system cover plate removal device during operation in accordance with embodiments of the present disclosure.
Figure 3B:
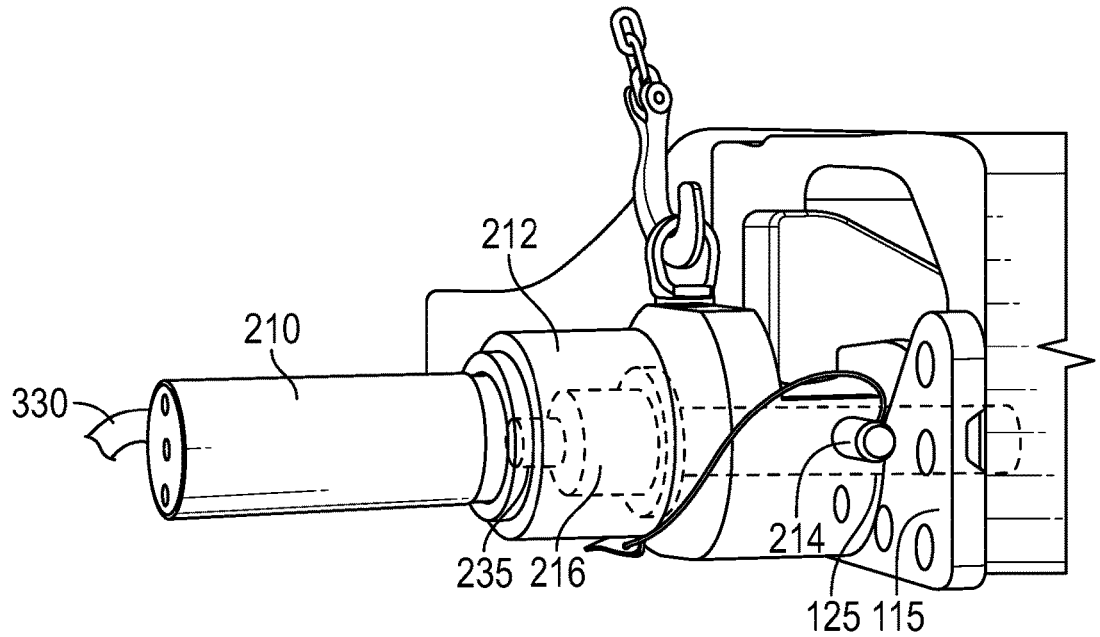
Figure 3C:
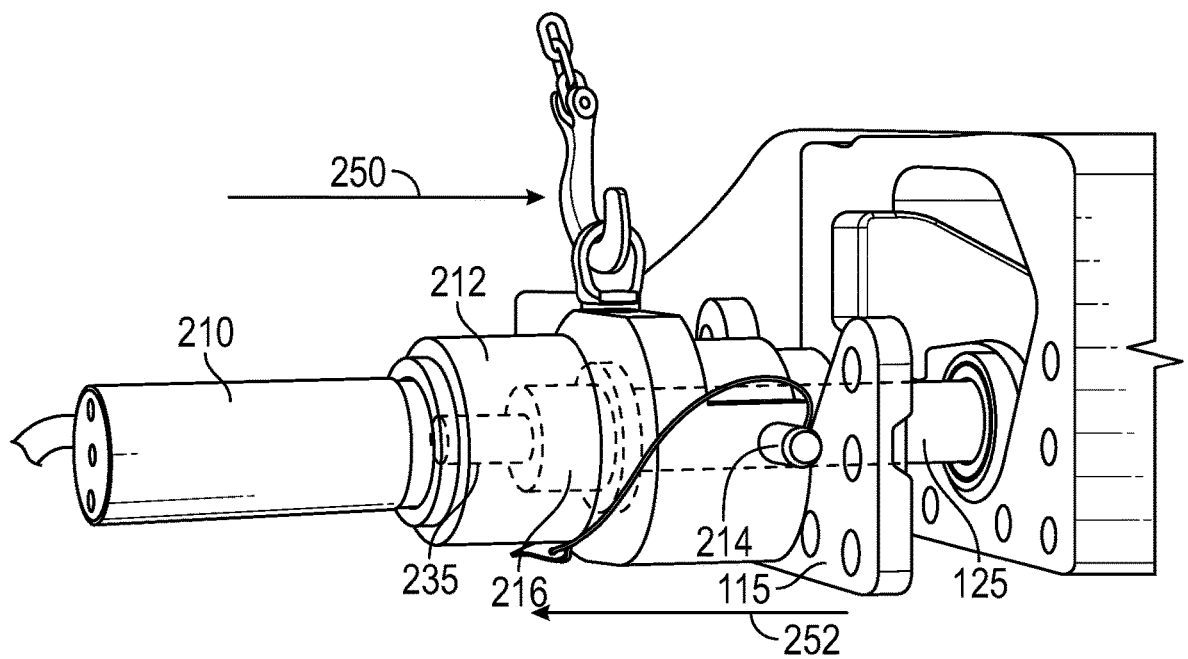

Operation of DWM system cover plate removal device 110 will now be discussed with respect to FIG. 12, and with respect to FIGS. 3A-3C, in accordance with embodiments of the present disclosure. FIGS. 3A-3C show views of DWM system cover plate removal device 110 during operation in accordance with embodiments of the present disclosure. FIG. 12 shows a high-level flow diagram 1200 of operation of a DWM system cover plate removal device configured in accordance with embodiments of the present disclosure for removing a DWM cover plate from a frame of a truck assembly.

As shown in FIG. 3A, which shows a DWM system after the T-Bar has been removed, DWM cover plate 115 may be attached to frame 115. DWM cover plate 115 may include protruding bushing channel 320, through which DWM main shaft 125 may be installed. In this example, protruding bushing channel 320 may include one or more pin slots 321 (e.g., may include one pin slot 321 on each side of protruding bushing channel 320). As noted above, removal of DWM cover plate 115 may not be possible manually (e.g., by hand), or may be too difficult or dangerous. In this case, it may be decided to remove DWM cover plate 115 from frame 115 using a DWM system cover plate removal device (e.g., DWM system cover plate removal device 110).

During operation, at block 1202, DWM system cover plate removal device 110 may be mounted onto DWM cover plate 115. In embodiments, as shown in FIG. 3B, mounting DWM system cover plate removal device 110 onto DWM cover plate 115 may include installing mandril 216 into the central opening of base 212 and positioning the distal end of mandril 216 against driver shaft 235 of actuator 210. Base 212, along with mandril 216, may then be positioned around protruding bushing channel 320 of DWM cover plate 115. At least one key 214, which in some embodiments includes a key on each side of base 212, may be inserted onto the key openings of base 212 (e.g., key openings 215a and 215b) and may go through the key openings and into the one or more pin slots 321 of protruding bushing channel 320 of DWM cover plate 115, which may securely attach base 212 to DWM cover plate 115.

In some embodiments, actuating medium source 330 may be attached to actuator 210. In embodiments, actuating medium source 330 may include a source that may provide a medium that actuator 210 may use to provide the extending driving force. For example, actuating medium source 330 may include a hydraulic fluid source, an electrical source, a pneumatic source, etc., based on the type of actuator 210.

During operation, at block 1204, DWM system cover plate removal device 110 may be activated. Activating DWM system cover plate removal device 110 may include activating actuator 210 to provide the extending driving force. In embodiments, actuator 210 may provide the extending driving force by causing mandril 216 to push against DWM main shaft 225. For example, with reference to FIG. 3C, actuator 210 may cause driver shaft 235 to extend outward from actuator 210 in direction 250 and push against the proximal end of mandril 216. The extending pushing action from driver shaft 235 onto of mandril 216 may cause of mandril 216 to push against DWM main shaft 225. An opposite reactive force (e.g., a pulling force in direction 252) may be created in response to mandril 216 pushing against DWM main shaft 225 in direction 250. The pulling force may cause base 212 to pull in direction 252. As base 212 is securely attached to DWM cover plate 115 (e.g., via keys 214 inserted into protruding bushing channel 320 of DWM cover plate 115), DWM cover plate 115 may be pulled by base 212 in direction 252 causing DWM cover plate 115 to separate from frame 151 while sliding through DWM main shaft 125 in direction 252.

In embodiments, DWM system cover plate removal device 110 may be removed from DWM system 150 and DWM cover plate 115 may be removed from DWM main shaft 125, such as manually (e.g., by hand). In some embodiments, DWM cover plate 115 may not be able to be removed from DWM main shaft 125 manually. In this case, a different mandril (e.g., a longer mandril 216*b* as shown in FIG. 2B) may be installed in DWM system cover plate removal device 110 and steps 1202 and 1204 may be repeated. In these embodiments, the longer mandril may allow DWM cover plate 115 to slide completely off DWM main shaft 125, as the longer mandril may allow DWM cover plate 115 to travel through DWM main shaft 125 until falling off the end of DWM main shaft 125.

A method of manufacturing a DWM system cover plate removal device will now be discussed with respect to FIG. 15, and with respect to FIGS. 4A-4E, in accordance with embodiments of the present disclosure. FIGS. 4A-4E show examples of configuration for various components of a DWM system cover plate removal device. FIG. 15 shows an exemplary flow diagram of operations for manufacturing a DWM system cover plate removal device configured with functionality for removing a DWM cover plate from a frame of a truck assembly in accordance with embodiments of the present disclosure. For example, the steps illustrated in the example blocks shown in FIG. 15 may be performed to manufacture DWM system cover plate removal device 110 of FIGS. 1A-3C, according to embodiments herein.

At block 1502, a base may be formed having one or more key openings configured to receive one or more keys to secure the base to a cover plate of a DWM system attached to a frame of a truck assembly of a railroad vehicle, and defining a central opening configured to align with a main shaft of the DWM system. For example, with reference to FIG. 4A, base 212 may be formed to include section 410 and section 412. Section 410 may be configured to couple to an actuator (e.g., actuator 210 of FIG. 2A) and section 412 may be configured to couple to a cover plate (e.g., DWM cover plate 115 of FIG. 1A). In embodiments, section 410 may have a general circular cross section, with a diameter D1, ranging from 3-5 inches, and may have a length L1 ranging from 3-5 inches. In embodiments, the interior of section 410 may be threaded, such as to attach to the actuator. In embodiments, the threaded interior of section 410 may have a length T1 ranging from 2-4 inches.

Figure 4A:
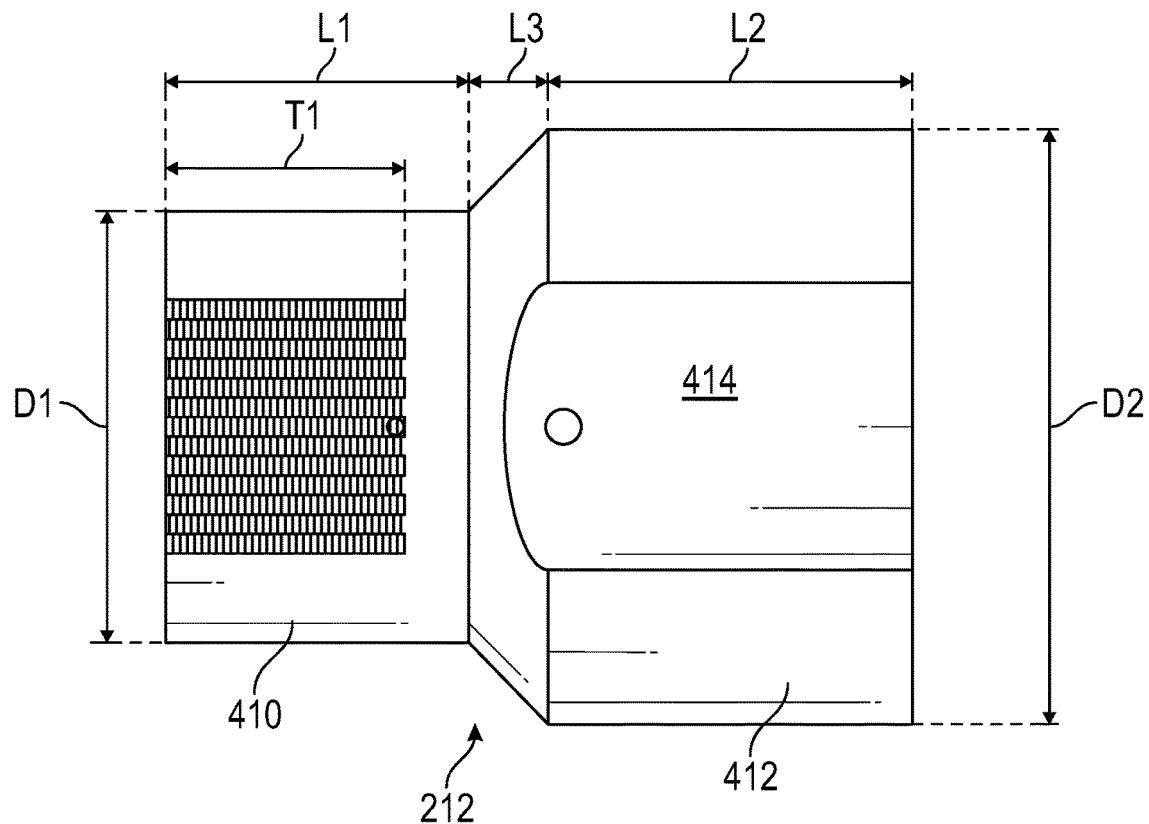
FIGS. 4A-4E show examples of configuration for various components of a DWM system cover plate removal device configured in accordance with embodiments of the present disclosure.
Figure 4B:
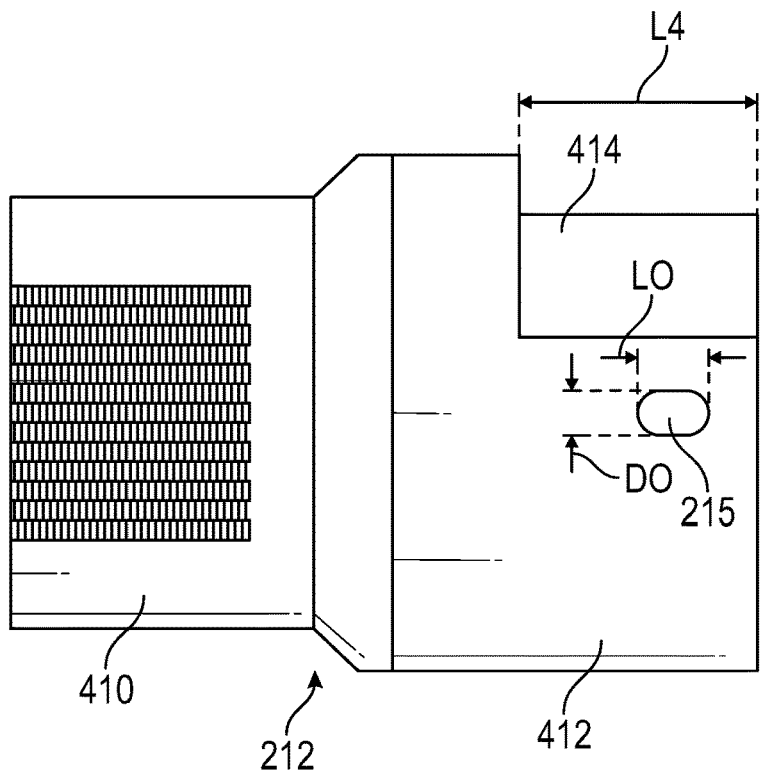

In embodiments, section 412 may have a general circular cross section, with opposites circle segments cutoff. Section 412 may have a diameter D2, ranging from 5-10 inches, and may have a length L2 ranging from 3-6 inches. In embodiments, section 412 may be coupled to section 410 using a tapered region, which may have a length L3 ranging between 0.5 and 1.5 inches. As shown in FIG. 4B, section 412 of base 212 may be formed with a section 414, of length L4 ranging from 2-4 inches, that may have a diameter smaller than D2. The one or more key openings may have a general obround shape with a diameter DO ranging from 0.3-0.7 inches and a length LO ranging from 0.4-1 inches. In some embodiments, the central opening of base 212 may have a diameter ranging from 2-5 inches.

Figure 4C:
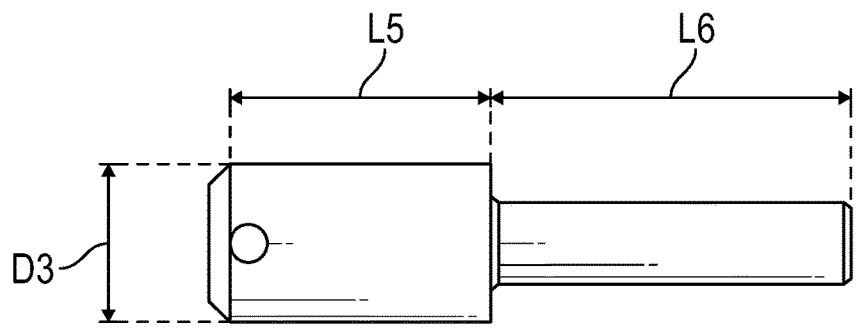
Figure 4D:
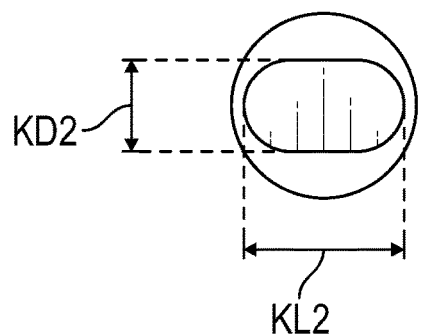

At block, 1504, an actuator may be coupled to the base. In embodiments, the actuator may be configured to provide a driving force. At block 1506, one or more keys configured to be inserted into the one or more key openings may be formed. As shown in FIGS. 4C and 4D, in embodiments, the keys may be constructed of heat-treated steel and may have a distal end of a general obround shape having a length L6 ranging from 1.5 and 3 inches, a diameter of KD2 ranging from 0.2 and 0.8 inches, and a width KW2 ranging from 0.5 to 1.2 inches, and a proximal end having a length L5 ranging from 1.2 to 3.2 inches and a diameter D3 ranging from 0.7 to 1.3 inches.

Figure 4E:
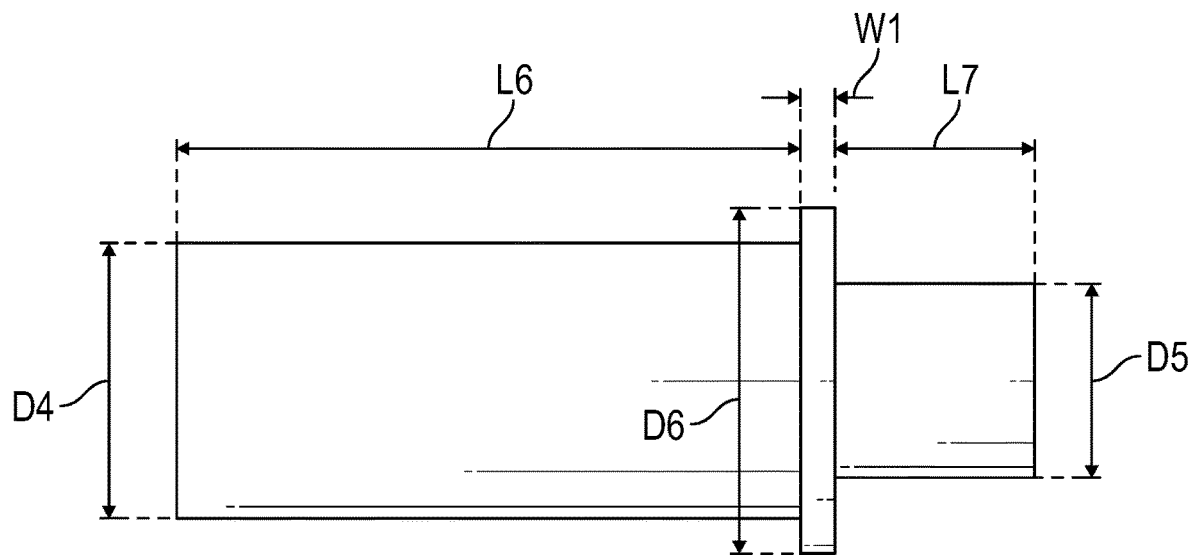

At block 1508, one or more mandrils may be formed. In embodiments, the one or more mandrils may be configured to be disposed within the central opening of the base, to contact, at a distal end of the one or more mandrils, the main shaft of the DWM system, and to receive, at a proximal end of the one or more mandrils, the driving force from the actuator. As described above, the one or more mandrils may include more than one type of mandrils. FIG. 4E illustrates an example configuration for the one or more mandrils. As shown in FIG. 4E, each of the one or more mandrils may include a proximal end having a diameter D5 ranging from 1-2 inches and length L7 ranging from 1-2 inches. In embodiments, the proximal end may be separated from the distal end by a transition section having a diameter D6 ranging from 2-3 inches and width W1 ranging from 0.1 to 0.5 inches. In embodiments, the distal end of each of the one or more mandril may have a diameter D4 ranging from 1.5-2.5 inches. In embodiments, the length L6 of the distal end of the one or more mandrils may based on the type of mandril. For example, a first type of mandril may have a length L6 ranging from 3-6 inches, and a second type of mandril may have a length L6 ranging from 0.5-2 inches.

With reference back to FIG. 1A and FIG. 1C, DWM crank and shaft removal device 120 may be configured to remove DWM main shaft 125 and/or DWM chain crank 127 from DWM system 150. In some embodiments, DWM main shaft 125 and/or DWM chain crank 127 may be removed from DWM system 150 after DWM cover plate 115 has been removed (e.g., using DWM system cover plate removal device 110). In some cases, removing DWM main shaft 125 from DWM system 150 may be very difficult, especially when DWM main shaft 125 may be "stuck" to DWM system 150, such that pulling DWM main shaft 125 out of DWM system 150 becomes extremely difficult if not impossible. In some cases, DWM main shaft 125 may become "stuck" to DWM chain crank 127, such that DWM main shaft 125 cannot easily be removed from DWM chain crank 127. This may be the case when DWM chain crank pin 157 may break. In these cases, DWM main shaft 125 often cannot be removed from DWM chain crank 127. In these cases, DWM crank and shaft removal device 120 may be used to remove DWM main shaft 125 and/or DWM chain crank 127 from DWM system 150.

Figure 5A:
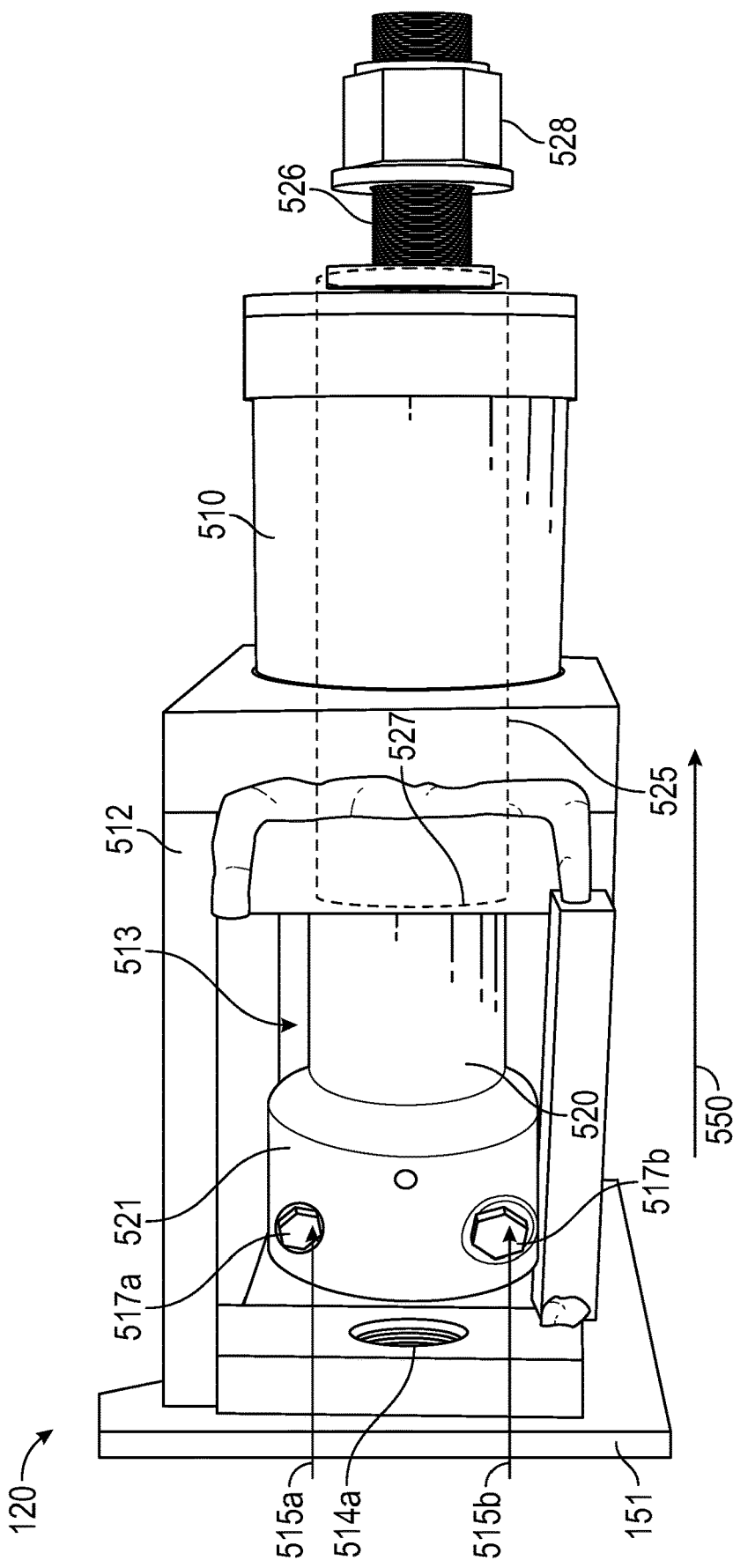
FIGS. 5A and 5B show different views of an example of a DWM crank and shaft removal device implemented in accordance with embodiments of the present disclosure.
Figure 5B:
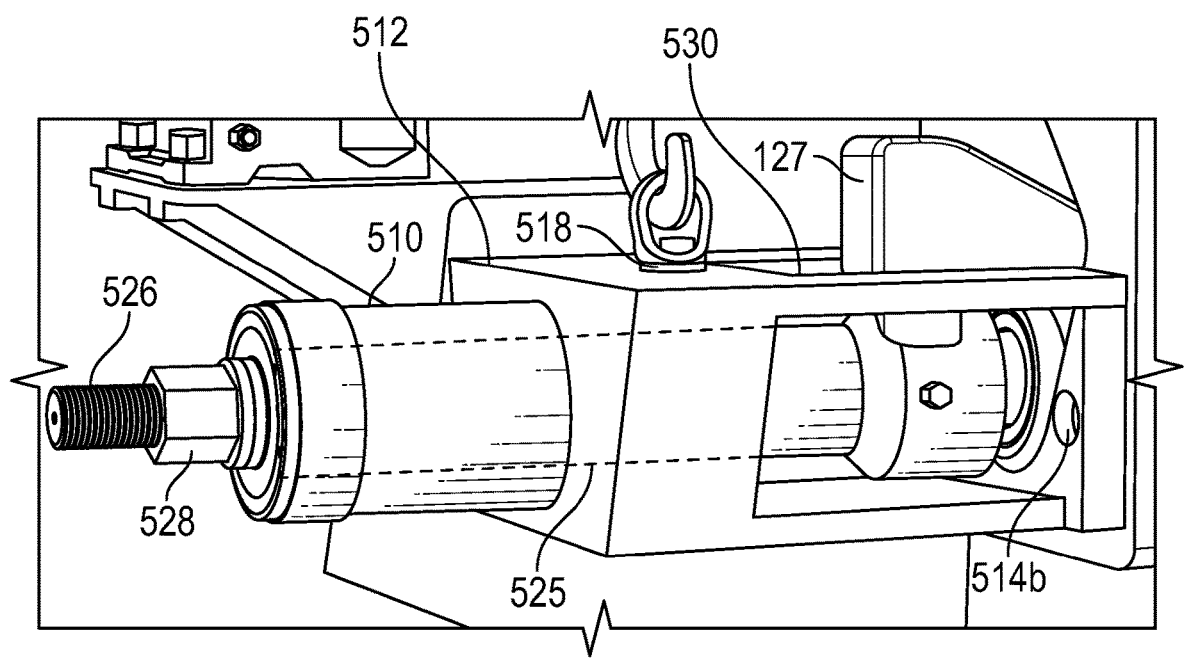

FIGS. 5A and 5B show different views of an example of DWM crank and shaft removal device 120 implemented in accordance with embodiments of the present disclosure. For example, DWM crank and shaft removal device 120 may be configured to remove DWM main shaft 125 and/or DWM chain crank 127, as illustrated in FIGS. 1A and 1C. As shown in FIG. 5A, DWM crank and shaft removal device 120 may include actuator 510, base 512, puller 520, and puller shaft 525. In embodiments, actuator 510 may be configured to provide a pulling force through puller 520 configured to pull DWM main shaft 125 away from DWM system 150. In embodiments, base 512 may be installed onto frame 151 and may provide a leverage against the pulling force from actuator 510, which may allow DWM main shaft 125 being pulled by puller 520. In embodiments, actuator 510 may include one or more of a hydraulic ram, a pneumatic actuator, an electromechanical actuator, an electromagnetic actuator, and/or any other component or device configured to provide a pulling driving force.

In embodiments, base 512 may be coupled to actuator 510 at a proximal end of base 512. For example, base 512 may be coupled to actuator 510 by providing threads in base 512 into which actuator 510 may be screwed. In some embodiments, base 512 may be coupled to actuator 510 using adhesives, soldering, welding, straps, screws, bolts, and/or any other mechanisms suitable for fastening base 512 to actuator 510. In embodiments, base 512 may be constructed of strong and/or sturdy materials, such as steel, or stronger materials. For example, in some embodiments, base 512 may be constructed of 1018 steel.

In embodiments, a distal end of base 512 may include one or more openings 514*a* and 514*b* (opening 514*b* is shown in FIG. 5B) configured to receive one or more fasteners allowing the distal end of base 512 to be mounted onto frame 151. For example, in some embodiments, fasteners 517*a* and 517*b* may include bolts or screws that may be used to securely attach base 512 onto frame 151.

In embodiments, base 512 may define an internal space 513. Internal space 513 may be configured to accommodate operation of puller 520 by defining a space within which puller 520 may move in response to the pulling driving force from actuator 510. In embodiments, internal space 513 may be configured to align with DWM main shaft 125 of DWM system 150. For example, internal space 513 may be configured to allow DWM main shaft 125 to be positioned approximately centered with internal space 513 when base 512 is attached to frame 151. In this manner, as described below, DWM main shaft 125 may be aligned with puller 520 such that puller 520 may pull DWM main shaft 125 away from DWM system 150 during operation.

In embodiments, as shown in FIG. 5B, base 512 may include opening 530 configured to provide a space for DWM chain crank 127 to be positioned without interfering with operations of DWM crank and shaft removal device 120. In embodiments, opening 530 may allow base 512 to be installed onto frame 151 around DWM chain crank 127. In this manner, DWM crank and shaft removal device 120 may operate to remove DWM main shaft 125 and/or DWM chain crank 127 while DWM chain crank 127 may protrude from the interior of frame 151.

In embodiments, puller 520 may be configured to securely attach to DWM main shaft 125 and to transfer the pulling driving force from actuator 510 to allow DWM crank and shaft removal device 120 to pull DWM main shaft 125 and/or DWM chain crank 127 from DWM system 150. In embodiments, a distal end of puller 520 may include collet portion 521 configured to be positioned around DWM main shaft 125. For example, collet portion 521 may include a central opening that may be configured to receive DWM main shaft 125, such that the central opening of collet portion 521 may surround DWM main shaft 125. In some embodiments, collet section 521 may include one or more openings 517*a* and 517*b*, configured to receive fasteners 515*a* and 515*b* to securely attach puller 520 to DWM main shaft 125. For example, fasteners 515*a* and 515*b* may include bolts, screws, etc., configured to be inserted through openings 517*a* and 517*b* into DWM main shaft 125 to securely attach puller 520 to DWM main shaft 125.

In embodiments, a proximal end of puller 520 may be configured to couple, connect, or otherwise contact puller shaft 525. Puller shaft 525 may be configured to transfer the pulling driving force from actuator 510 onto puller 520. For example, puller shaft 525 may have a distal end 527 configured to connect (e.g., by threading, screwing, or other mechanisms for secure attachment) to puller 520 and a proximal end 526 configured to connect to tightening element 528. In embodiments, actuator 510 may provide the pulling driving force to pull puller shaft 525 in direction 550, which is a direction away from frame 151 and DWM system 150. In embodiments, the pulling force applied to puller shaft 525 may be transferred to puller 520, which may be securely connected to DWM main shaft 125, causing DWM main shaft 125 to be pulled in direction 550 from DWM system 150. In embodiments in which DWM chain crank 127 may be "stuck" to DWM main shaft 125, the pulling force in direction 550 may cause DWM main shaft 125 and DWM chain crank 127 to be pulled together in direction 550. In this manner, DWM crank and shaft removal device 120 may be configured to remove DWM main shaft 125 and/or DWM chain crank 127.

In some embodiments, base 512 may include lifting element 518. Lifting element 518 may be configured to allow or facilitate lifting (e.g., using a powered lifting mechanism) of DWM crank and shaft removal device 120 during operation. In some embodiments, lifting element 518 may include an eyelet, a ring, a hook, and/or any other mechanism suitable to attach to base 512 and to allow lifting of DWM crank and shaft removal device 120.

Operation of DWM crank and shaft removal device 120 will now be discussed with respect to FIG. 13, and with respect to FIGS. 6A-6D, in accordance with embodiments of the present disclosure. FIGS. 6A-6D show views of DWM crank and shaft removal device 120 during operation in accordance with embodiments of the present disclosure. FIG. 13 shows a high-level flow diagram 1300 of operation of a DWM crank and shaft removal device configured in accordance with embodiments of the present disclosure for removing a DWM main shaft and/or a DWM chain crank from a DWM system installed in a truck assembly of a railroad vehicle.

Figure 6A:
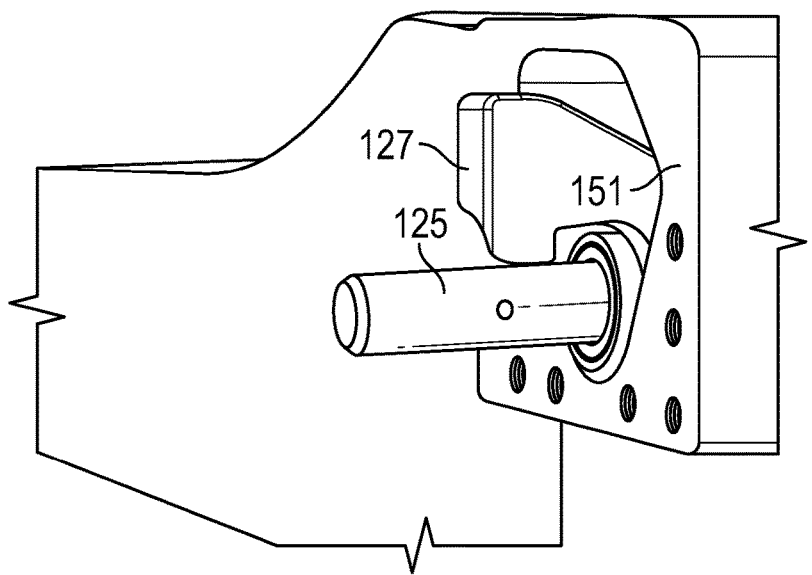
FIGS. 6A-6D show various views of a DWM crank and shaft removal device during operation in accordance with embodiments of the present disclosure.

As shown in FIG. 6A, which shows a DWM system after the DWM cover plate has been removed, DWM main shaft 125 may be attached to DWM chain crank 127, and both DWM main shaft 125 and DWM chain crank 127 may be within frame 151. As noted above, removal of DWM main shaft 125 and/or DWM chain crank 127 may not be possible manually (e.g., by hand), or DWM main shaft 125 may be stuck to DWM chain crank 127. In this case, it may be decided to remove DWM main shaft 125 and/or DWM chain crank 127 from DWM system 150 using a DWM crank and shaft removal device (e.g., DWM crank and shaft removal device 120).

Figure 6B:
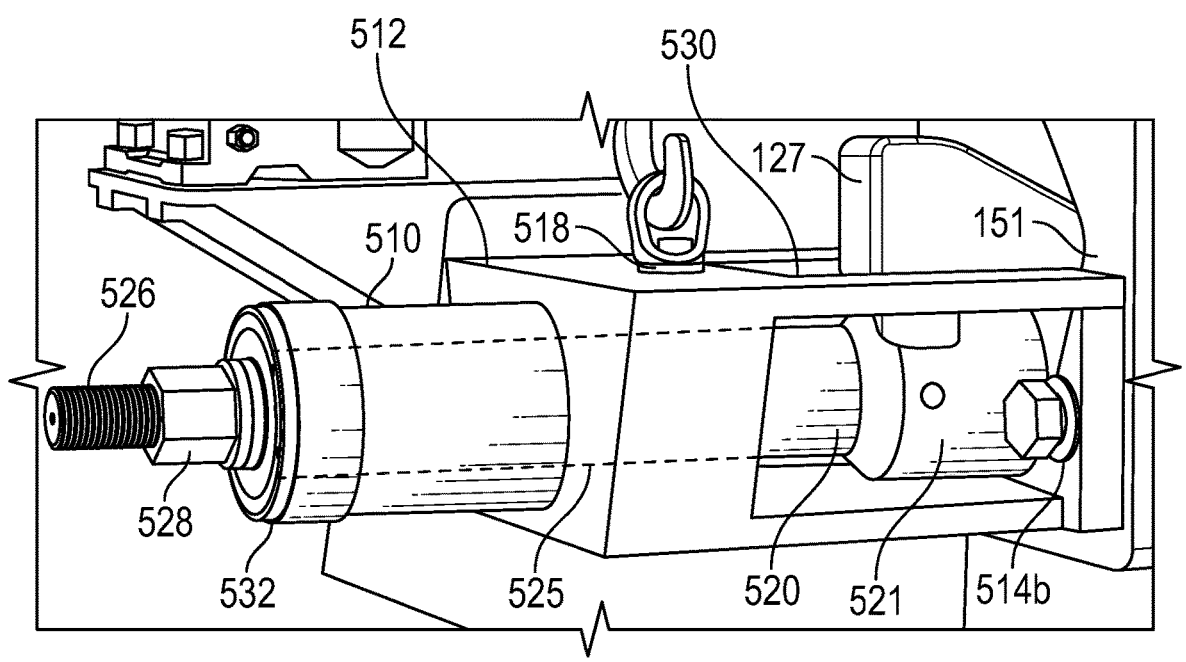
Figure 6C:
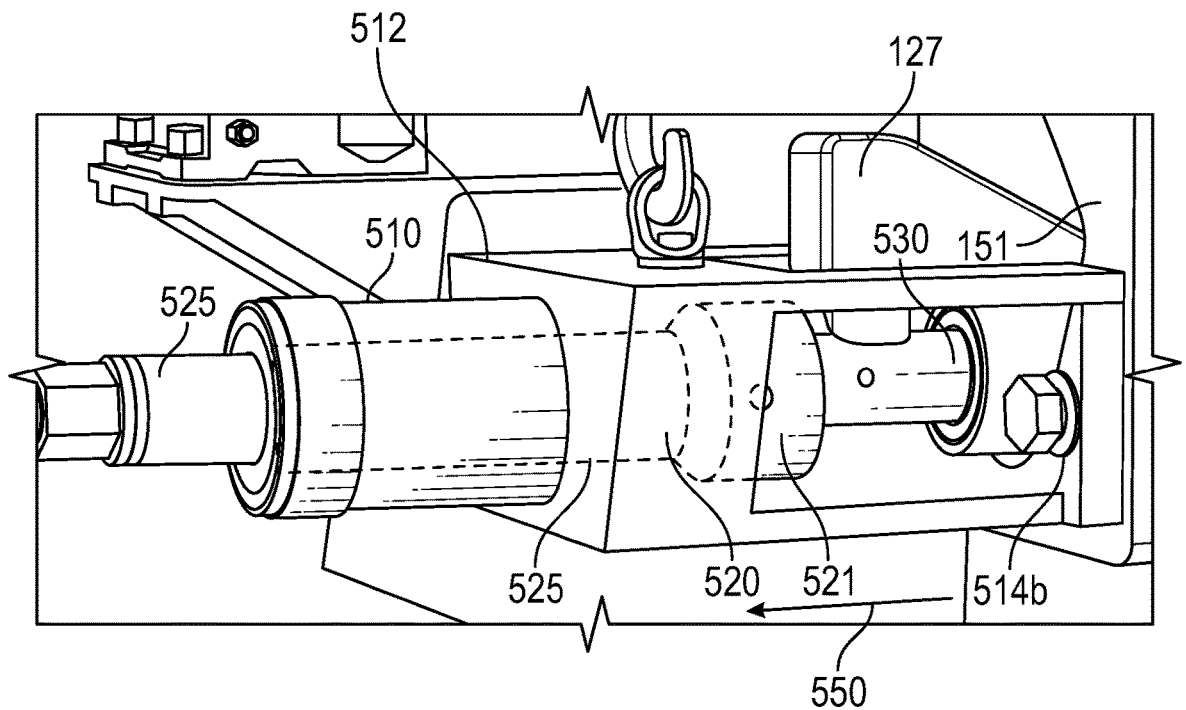

During operation, at block 1302, DWM crank and shaft removal device 120 may be mounted onto frame 151. In embodiments, as shown in FIG. 6B, mounting DWM crank and shaft removal device 120 onto frame 151 may include positioning the distal end of base 512 against frame 151 and attaching at least one fastener through openings 514*a* and 514*b* to secure base 512 onto frame 151. In embodiments, mounting DWM crank and shaft removal device 120 onto frame 151 may include positioning collet 521 of puller 520 around DWM main shaft 125. One or more fasteners may be inserted through collet 521 to attach to DWM main shaft 125 to secure puller 520 onto DWM main shaft 125.

In some embodiments, actuating medium source 532 may be attached to actuator 510. In embodiments, actuating medium source 532 may include a source that may provide a medium that actuator 510 may use to provide the pulling driving force. For example, actuating medium source 532 may include a hydraulic fluid source, an electrical source, a pneumatic source, etc., based on the type of actuator 510.

During operation, at block 1304, DWM crank and shaft removal device 120 may be activated. Activating DWM crank and shaft removal device 120 may include activating actuator 510 to provide the pulling driving force. In embodiments, actuator 510 may provide the pulling driving force by causing puller shaft 525 to be pulled in a direction away from frame 151 and to transfer the pulling force to puller 520, which may pull DWM main shaft 225 in the direction away from frame 151. For example, with reference to FIG.

6C, actuator 510 may cause puller shaft 525 to be pulled away from frame 151 in direction 550. The pulling force applied to puller shaft 525 may be transferred to puller 520, as puller shaft 525 may be attached to puller 520. As such, puller 520 may be pulled in direction 550, and as puller 520 may be securely attached to DWM main shaft 125, DWM main shaft 125 may be pulled in direction 550 away from frame 151. As base 512 may be securely attached to frame 151, base 512 may provide a leverage against the pulling force from puller 520 onto DWM main shaft 125, which may allow DWM main shaft 125 being pulled by puller 520.

Figure 6D:
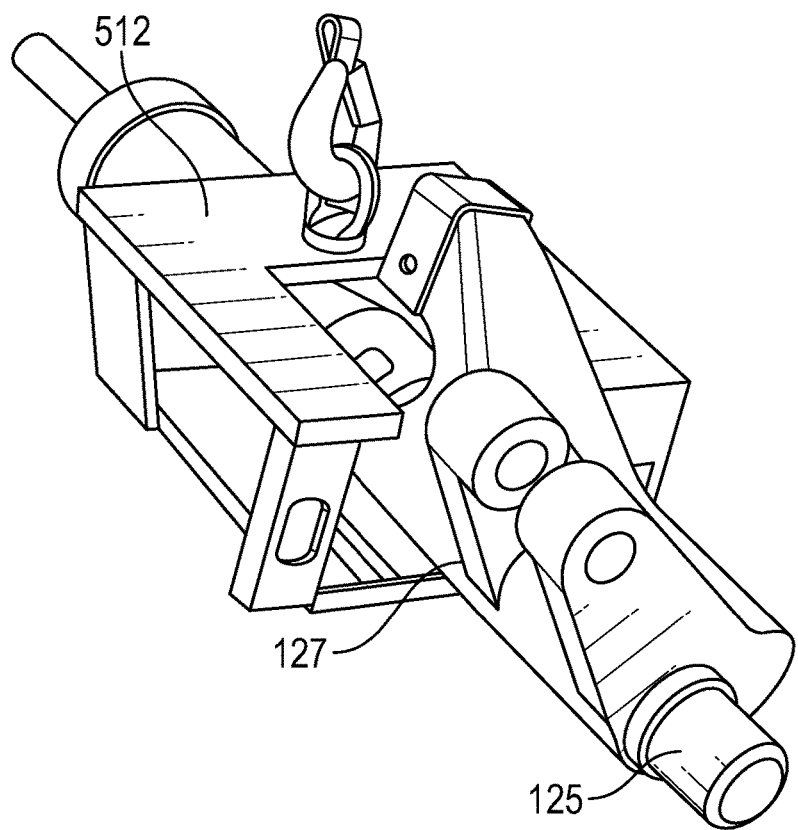

In this example, DWM chain crank 127 may be "stuck" to DWM main shaft 125. In this case, the pulling force in direction 550 from puller 520 onto DWM main shaft 125 may cause DWM main shaft 125 and DWM chain crank 127 to be pulled together in direction 550. In this manner, DWM crank and shaft removal device 120 may be configured to remove DWM main shaft 125 and/or DWM chain crank 127 from DWM system 150. For example, as shown in FIG. 6D, DWM main shaft 125 and DWM chain crank 127 may be removed together from DWM system 150.

Figure 16:
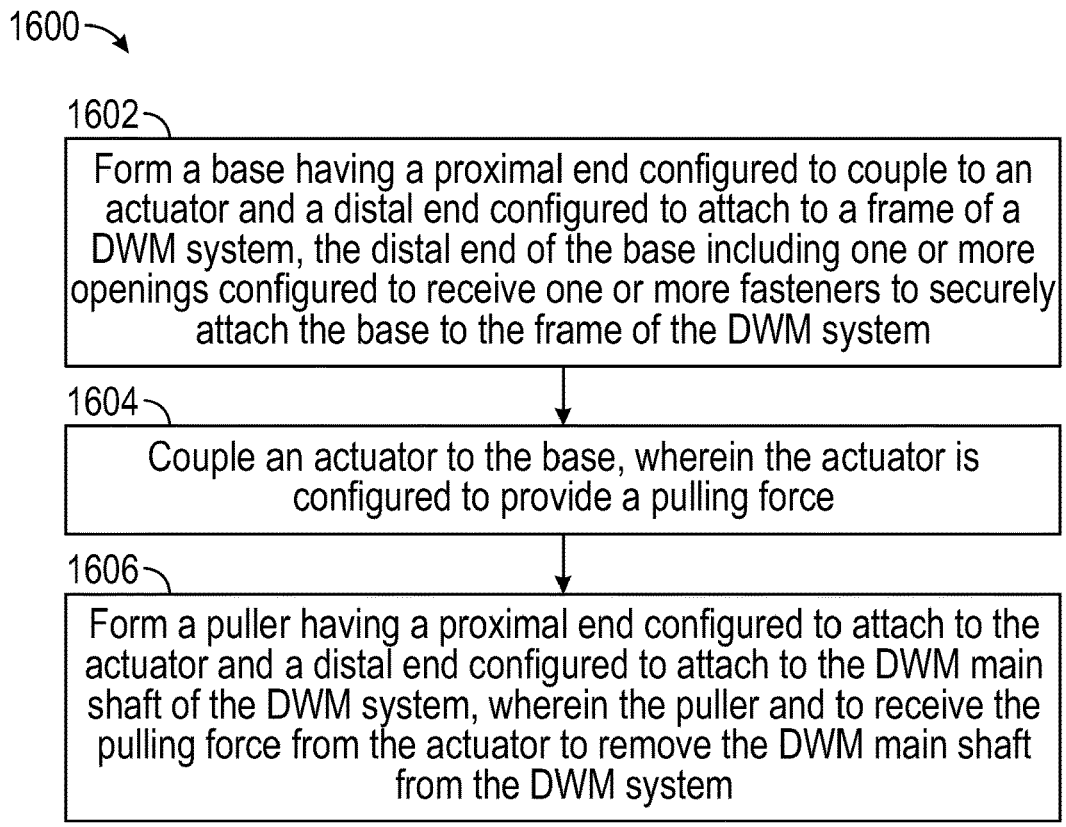
FIG. 16 shows an exemplary flow diagram of operations for manufacturing a DWM crank and shaft removal device configured with functionality for removing a DWM main shaft and/or a DWM chain crank from a DWM system installed in a truck assembly of a railroad vehicle in accordance with embodiments of the present disclosure.

A method of manufacturing a DWM crank and shaft removal device will now be discussed with respect to FIG. 16, and with respect to FIGS. 7A-7D, in accordance with embodiments of the present disclosure. FIGS. 7A-7D show examples of configuration for various components of a DWM crank and shaft removal device implemented in accordance with embodiments of the present disclosure. FIG. 16 shows an exemplary flow diagram of operations for manufacturing a DWM crank and shaft removal device configured with functionality for removing a DWM main shaft and/or a DWM chain crank from a DWM system installed in a truck assembly of a railroad vehicle in accordance with embodiments of the present disclosure. For example, the steps illustrated in the example blocks shown in FIG. 16 may be performed to manufacture DWM crank and shaft removal device 120 of FIGS. 1A-3C, according to embodiments herein.

At block 1602, a base may be formed having a proximal end configured to couple to an actuator and a distal end configured to attach to a frame of a DWM system. In embodiments, the distal end of the base may include one or more openings configured to receive one or more fasteners to securely attach the base to the frame of the DWM system. For example, with reference to FIG. 7A, base 512 may be formed to include distal end 710 and proximal end 712. Proximal end 712 may be configured to couple to an actuator (e.g., actuator 510 of FIG. 5A) and distal end 710 may be configured to couple to a frame of a DWM system (e.g., frame 151 of DWM system 150 of FIGS. 1A and 5A). In embodiments, proximal end 712 may have a general trapezoidal shape, with a base length L2 ranging from 10 to 14 inches, a length L1 ranging from 6 to 10 inches, and a height H1 ranging from 3 to 7 inches. In embodiments, distal end 710 may have a general rectangular shape, with a length L2 ranging from 10 to 14 inches and a height H2 ranging from 3 to 7 inches.

Figure 7A:
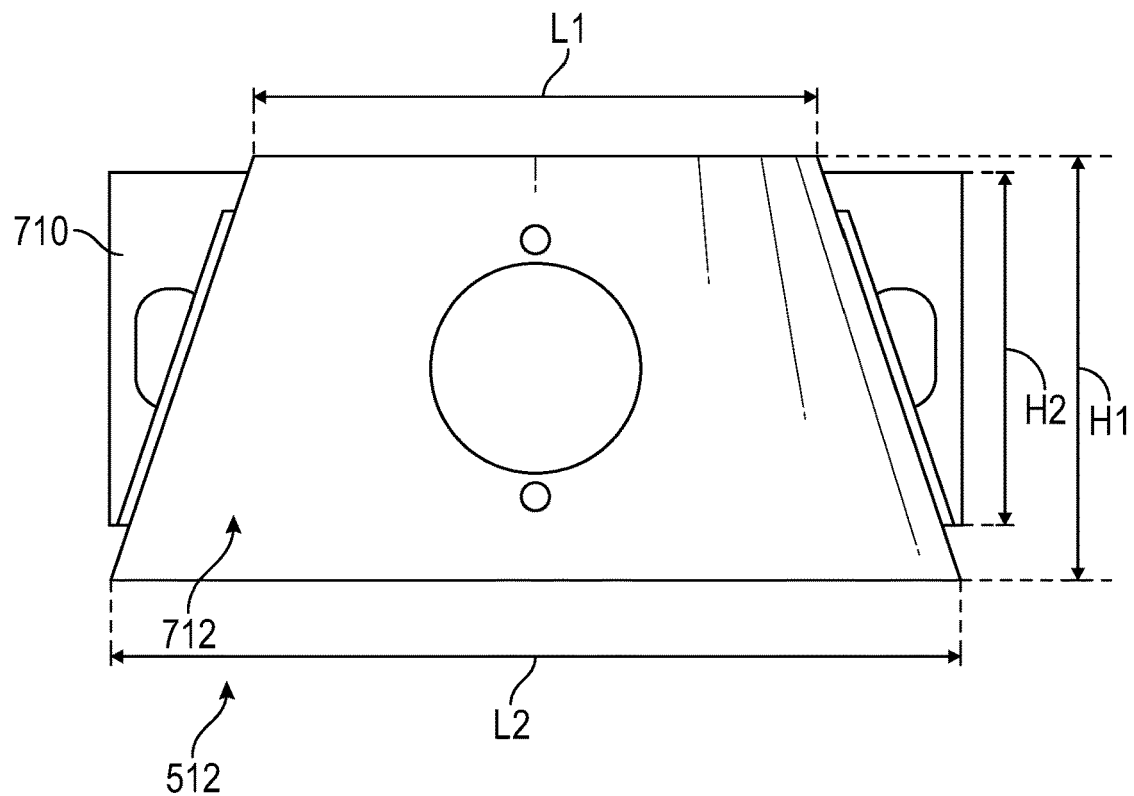
FIGS. 7A-7D show examples of configuration for various components of a DWM crank and shaft removal device configured in accordance with embodiments of the present disclosure.
Figure 7B:
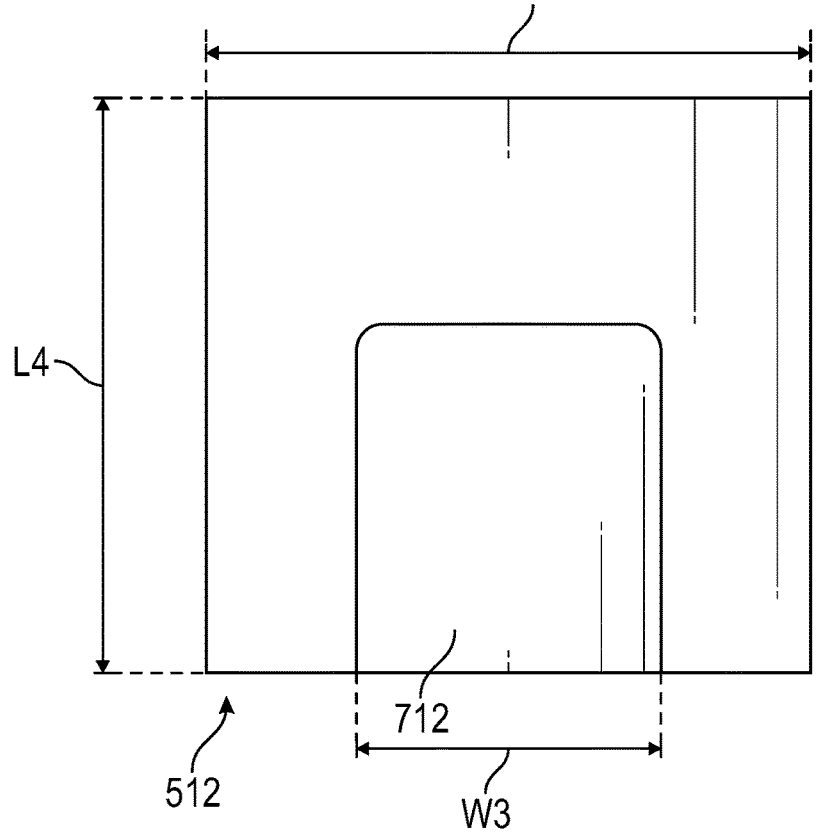

In embodiments, as shown in FIG. 7B, which shows a top view of base 512, base 512 may have a length L4 ranging from 10 to 13 inches and a width W4 ranging from 10 to 13 inches. In embodiments, base 512 may define opening 712 configured to configured to provide a space for a DWM chain crank to be positioned without interfering with operations of DWM crank and shaft removal device 120. In embodiments, opening 712 have length L3 ranging from 5 to 9 inches and width W3 ranging from 4-8 inches.

Figure 7C:
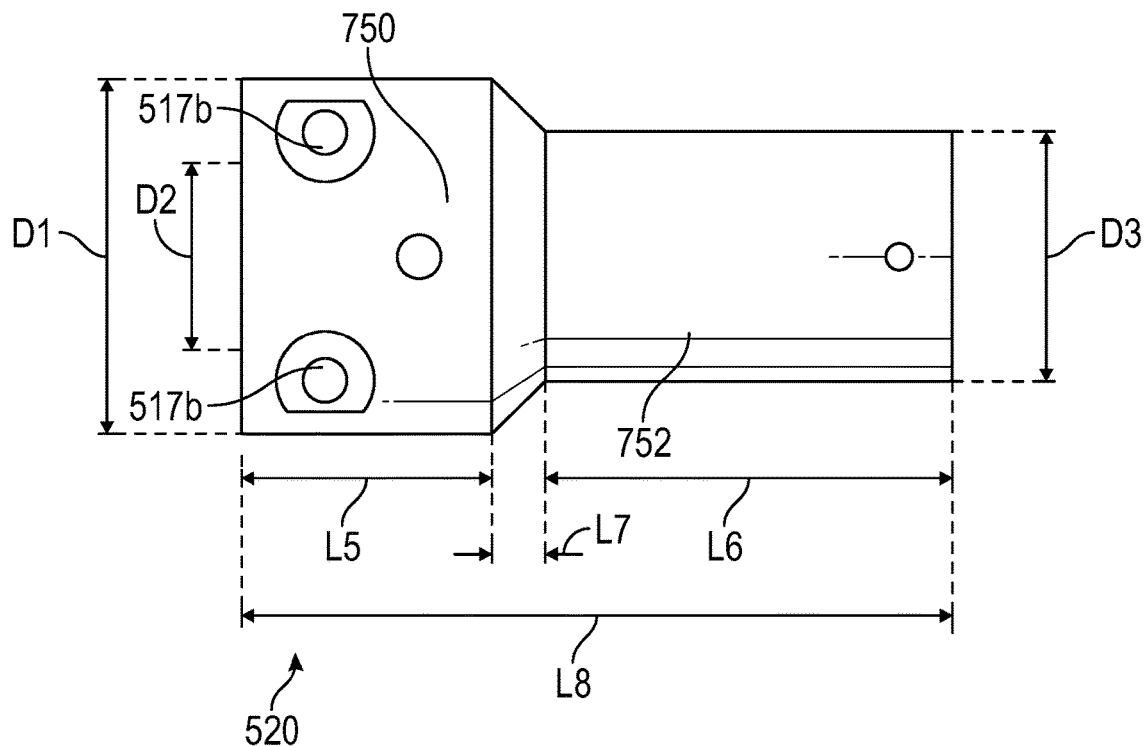

At block 1604, the actuator may be coupled to the base. In embodiments, the actuator may be configured to provide a pulling driving force. At block 1606, a puller may be formed. FIG. 7C illustrates an example configuration for a puller. As shown in FIG. 7C, puller 520 may have a length L8 ranging from 7 to 10 inches. Puller 520 may be formed with two sections, collet 750 and section 752. In embodiments, collet 750 may be configured to attach to the DWM main shaft of the DWM system, and section 752 may be configured to attach to the puller shaft, which may be configured to attach to the actuator for receiving the pulling driving force. In embodiments, collet 750 may have a general circular shape, with an outer diameter D1 ranging from 3 to 5.5 inches and a length L5 ranging from 2 to 4 inches. Collet 750 may have a central opening that may be configured to be positioned around the DWM main shaft. In embodiments, the central opening may have a diameter D2 ranging from 1.5 to 3 inches. In embodiments, collet 750 may be formed with one or more openings, such as opening 517a and 517b configured to receive fasteners for securely attaching collet 750 to the DWM main shaft. In embodiments, section 752 of puller 520 may general circular cross-section of diameter D3 ranging from 2 to 4 inches and a length L6 ranging from 4 to 6 inches.

Figure 7D:
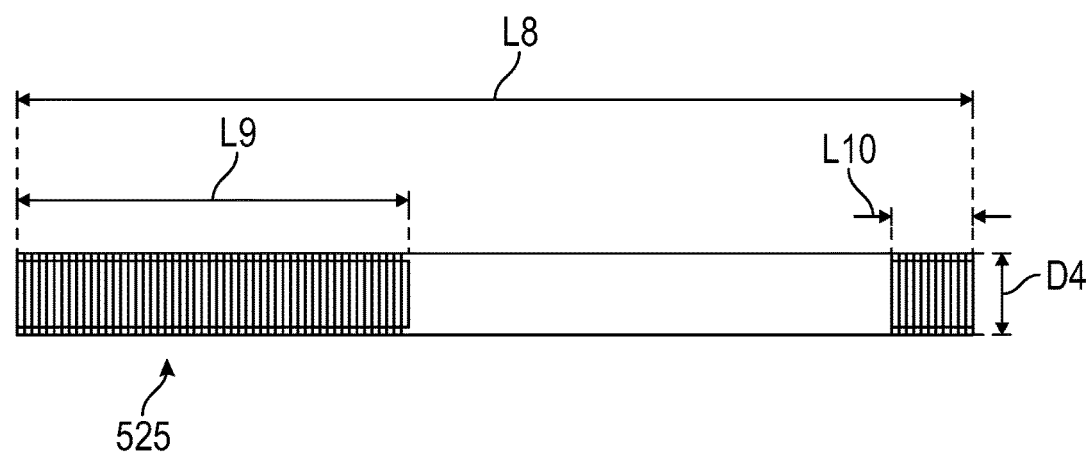

In embodiments, a puller shaft 525 may be formed. FIG. 7D illustrates an example configuration for a puller shaft. As shown in FIG. 7D, puller shaft 525 may have a general circular cross-section of diameter D4 ranging from 0.5 to 2 inches and a length L8 ranging from 12 to 17 inches. In embodiments, a distal end of puller shaft 525 may include a threaded section of length L9 ranging from 3 to 7 inches, and a proximal end of puller shaft 525 may include a threaded section of length L10 ranging from 0.5 to 2 inches.

With reference back to FIG. 1A and FIG. 1C, DWM bushing maintenance device 130 may be configured to enable maintenance of frame bushing 135. In some embodiments, DWM bushing maintenance device 130 may be configured to install and/or remove frame bushing 135 from frame 151. In some embodiments, frame bushing 135 may be removed from DWM system 150 after DWM cover plate 115, DWM main shaft 125, and DWM chain crank 127 has been removed (e.g., using DWM system cover plate removal device 110 and DWM crank and shaft removal device 120). In these cases, DWM bushing maintenance device 130 may be used to remove frame bushing 135 from frame 151.

Figure 8A:
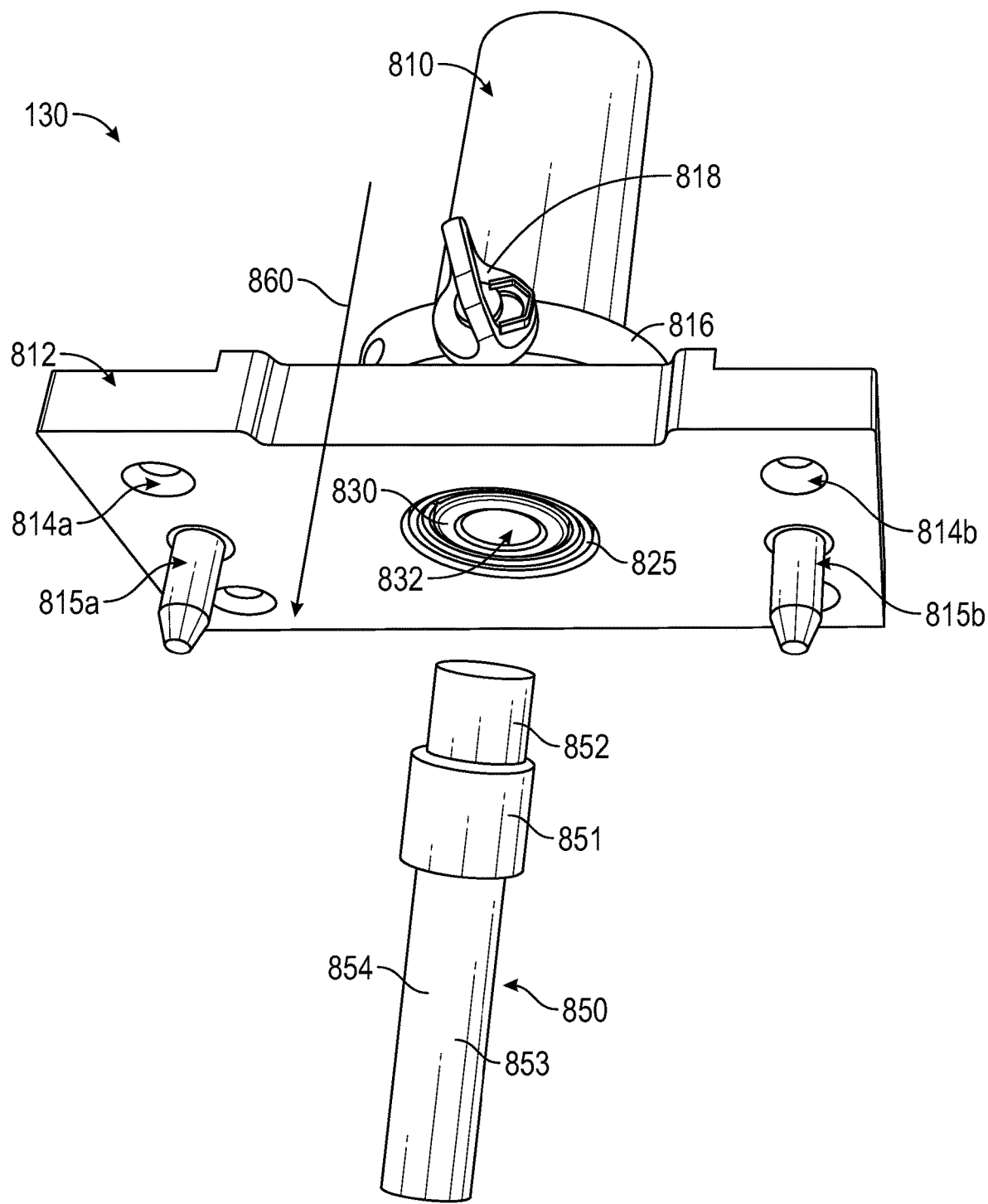
FIG. 8A shows an example of a DWM bushing maintenance device implemented in accordance with embodiments of the present disclosure.

FIG. 8A shows an example of DWM bushing maintenance device 130 implemented in accordance with embodiments of the present disclosure. For example, DWM bushing maintenance device 130 may be configured to remove frame bushing 135 from frame 151, as illustrated in FIGS. 1A and 1C. As shown in FIG. 8A, DWM bushing maintenance device 130 may include actuator 810, base 812, collar 816, push driver 830, and mandril 850. In embodiments, actuator 810 may be configured to provide a pushing force through push driver 830. The pushing force provided by actuator 810 may be in direction 860. In embodiments, during operation, mandril 850 may be attached to push driver 830 and the pushing force from actuator 810 may be transferred to mandril 850 such that mandril 850 may be pushed in direction 860. In embodiments, base 812 may be installed onto frame 151 and may provide a leverage against the pushing force from actuator 810, which may allow DWM bushing maintenance device 130 to push frame bushing 135 through frame 151. In some embodiments, such as in operation to install frame bushing 135 onto frame 151, base 812 may also provide stability to ensure that frame bushing 135 is installed straight and correctly. In embodiments, actuator 810 may include one or more of a hydraulic ram, a pneumatic actuator, an electromechanical actuator, an electromagnetic actuator, and/or any other component or device configured to provide a pushing force.

In embodiments, base 812 may be coupled to actuator 810. For example, base 812 may include threads that may allow actuator 810 to screwed into base 812. In some embodiments, collar 816 may be configured to couple base 812 to actuator 810. For example, collar 816 may wrap around actuator 810 and a side of base 812. In this manner, collar 816 may couple base 812 to actuator 810. In some embodiments, collar 816 may include lifting element 818. Lifting element 818 may be configured to allow or facilitate lifting (e.g., using a powered lifting mechanism) of DWM bushing maintenance device 130 during operation. In some embodiments, lifting element 818 may include an eyelet, a ring, a hook, and/or any other mechanism suitable to attach to collar 816 and to allow lifting of DWM bushing maintenance device 130. In embodiments, base 812 may be constructed of strong and/or sturdy materials, such as steel, or stronger materials. For example, in some embodiments, base 812 may be constructed of hot roll steel.

In embodiments, base 812 may include one or more openings (e.g., 814a and 814b) configured to receive one or more fasteners allowing base 812 to be mounted onto frame 151. For example, in some embodiments, bolts or screws may be inserted through each of opening 814a and 814b into frame 151 to securely attach base 812 to frame 151. In embodiments, base 812 may include one or more guide pins (e.g., guide pins 815a and 815b) configured to be inserted into an opening of frame 151 (e.g., a bolt or screw hole of frame 151) to ensure that base 812 remains aligned to frame 151 during operation of DWM bushing maintenance device 130. In embodiments, ensuring that base 812 remains aligned to frame 151 during operation of DWM bushing maintenance device 130, such as during installation of frame bushing 135 into frame 151, may ensure that frame bushing 135 is installed correctly and aligned properly into frame 151.

In embodiments, base 812 may define a central opening 825. Central opening 825 may be configured to allow push driver 830 to move through base 812 during operation without interference. In embodiments, central opening 825 may be configured to align with the space where frame bushing may be installed or is to be installed within frame 151 (e.g., the frame bushing opening). For example, central opening 825 may be configured to allow the space where frame bushing may be installed or is to be installed within frame 151 to be positioned approximately centered with central opening 825 when base 812 is attached to frame 151. In this manner, as described below, mandril 850 may operate aligned with the space where frame bushing may be installed or is to be installed within frame 151 during operation.

In embodiment, mandril 850 may be configured to receive the pushing force from push driver 830 and to push frame bushing 135 through the frame bushing opening within frame 151 (e.g., the space where frame bushing may be installed or is to be installed within frame 151). In embodiments, mandril 850 may include main shaft 853, flange section 851, and holding section 852. In embodiments, main shaft 853 may be configured to attach, such as at distal end 854, to push driver 830. For example, push driver 830 may have a central opening configured to receive distal end 854 of mandril 850.

Figure 8B:
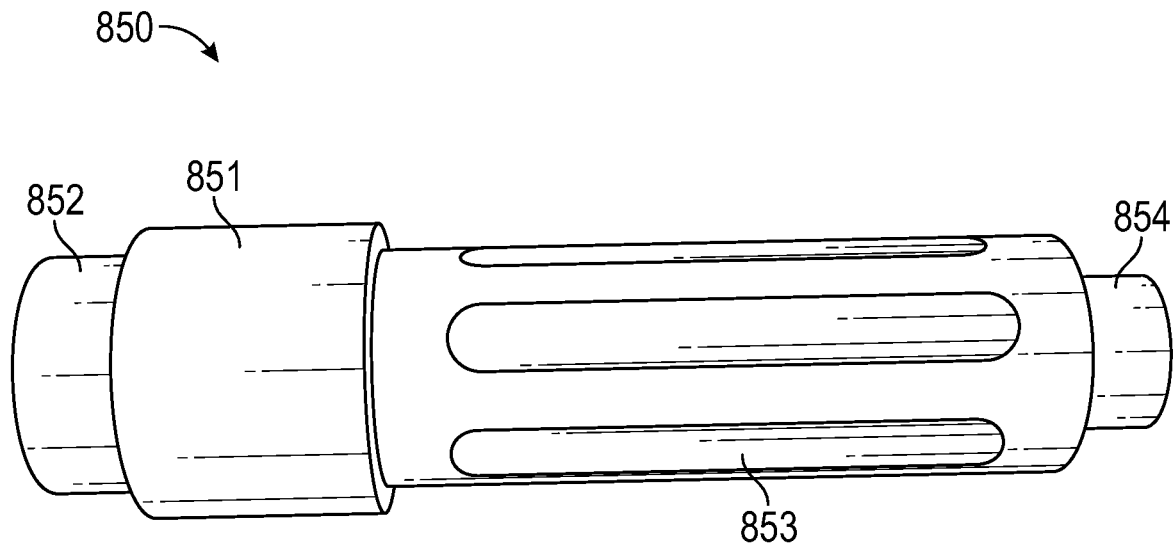
FIG. 8B shows an example configuration of a mandril to be used for frame bushing installation in accordance with embodiments of the present disclosure.

In embodiments, holding section 852 may be configured to be inserted through frame bushing 135, and flange section 851 may provide a mechanism to prevent frame bushing 135 from sliding through mandril 850 and, in some embodiments, a mechanism to align the installation of frame bushing 135 into the frame bushing opening of frame 151. In embodiments, the configuration of holding section 852 and flange section 851 may be based on the type of mandril 850. For example, mandril 850 may be a removal mandril configured to be used with DWM bushing maintenance device 130 for removal of frame bushing 135 from frame 151. FIG. 8B shows an example configuration of a mandril to be used for frame bushing installation in accordance with embodiments of the present disclosure. In particular, in this example, flange section 851 of mandril 850 may be configured to ensure that flange section 851 may abut frame bushing 135 such that flange section 851 may push against frame bushing 135 to move frame bushing 135 through the frame bushing opening in which frame bushing 135 is installed, while also allowing flange section 851 to pass through the frame bushing opening. In this manner, mandril 850 as shown in FIG. 8B may push frame bushing 135 out of the frame bushing opening in which frame bushing 135 is installed thereby removing frame bushing 135 from frame 151.

Figure 8C:
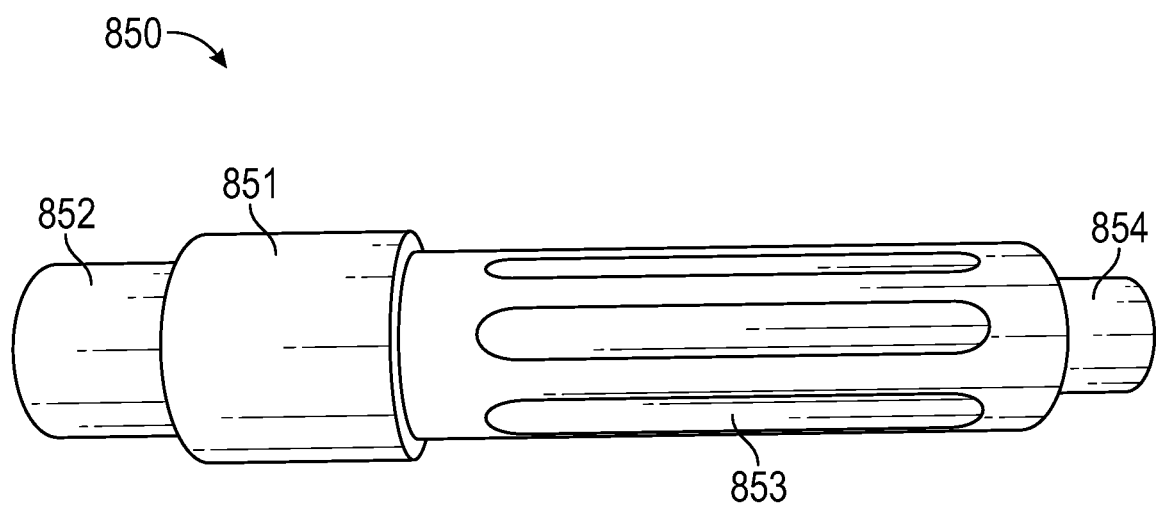
FIG. 8C shows an example configuration of a mandril to be used for frame bushing installation in accordance with embodiments of the present disclosure.

In another example, mandril 850 may be an installation mandril configured to be used with DWM bushing maintenance device 130 for installing frame bushing 135 into frame 151. FIG. 8C shows an example configuration of a mandril to be used for frame bushing installation in accordance with embodiments of the present disclosure. In particular, in this example, flange section 851 of mandril 850 may be configured to ensure that flange section 851 may abut frame bushing 135 such that flange section 851 may push against frame bushing 135 to move frame bushing 135 through the frame bushing opening in which frame bushing 135 is installed. However, in these embodiments, flange section 851 may have a larger cross-sectional diameter than flange section 851 of mandril 850 as illustrated in FIG. 8B. In this case, flange section 851 may not be allowed to pass through the frame bushing opening. As a result, when frame bushing 135 is pressed into the frame bushing opening and flange section 851 is flushed against frame 151, flange section 851 is prevented from going further into the frame bushing opening, ensuring that frame bushing 135 is installed aligned within the frame bushing opening.

Figure 9A:
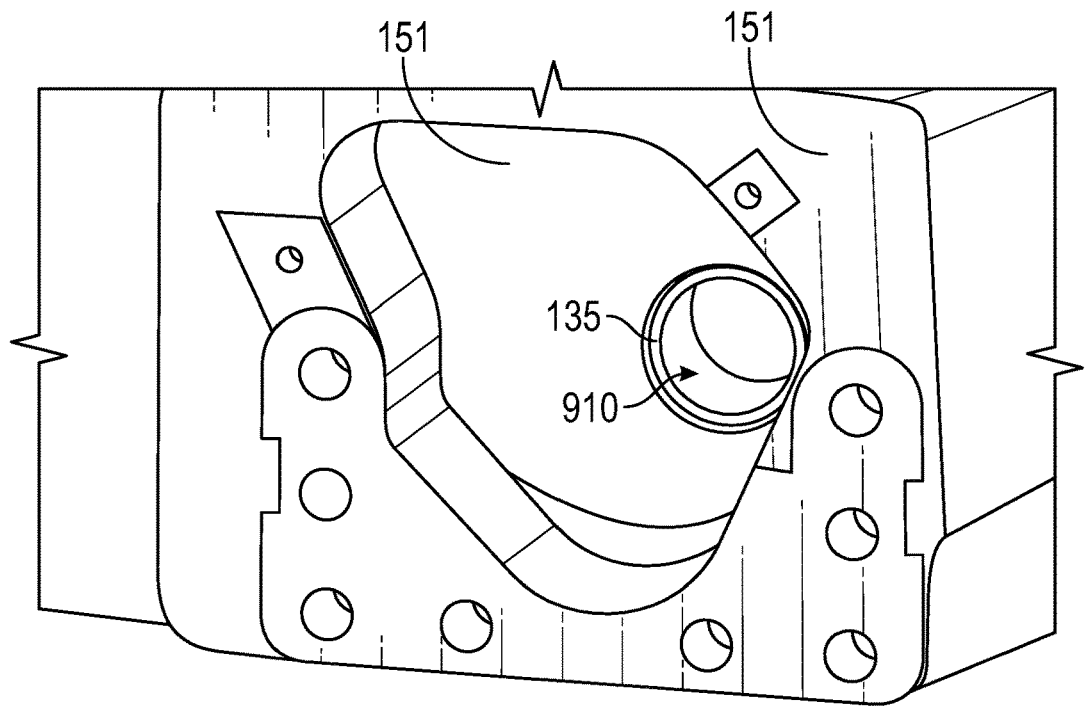
FIGS. 9A-9C show different views of a DWM bushing maintenance device during frame bushing removal operations in accordance with embodiments of the present disclosure.
Figure 9B:
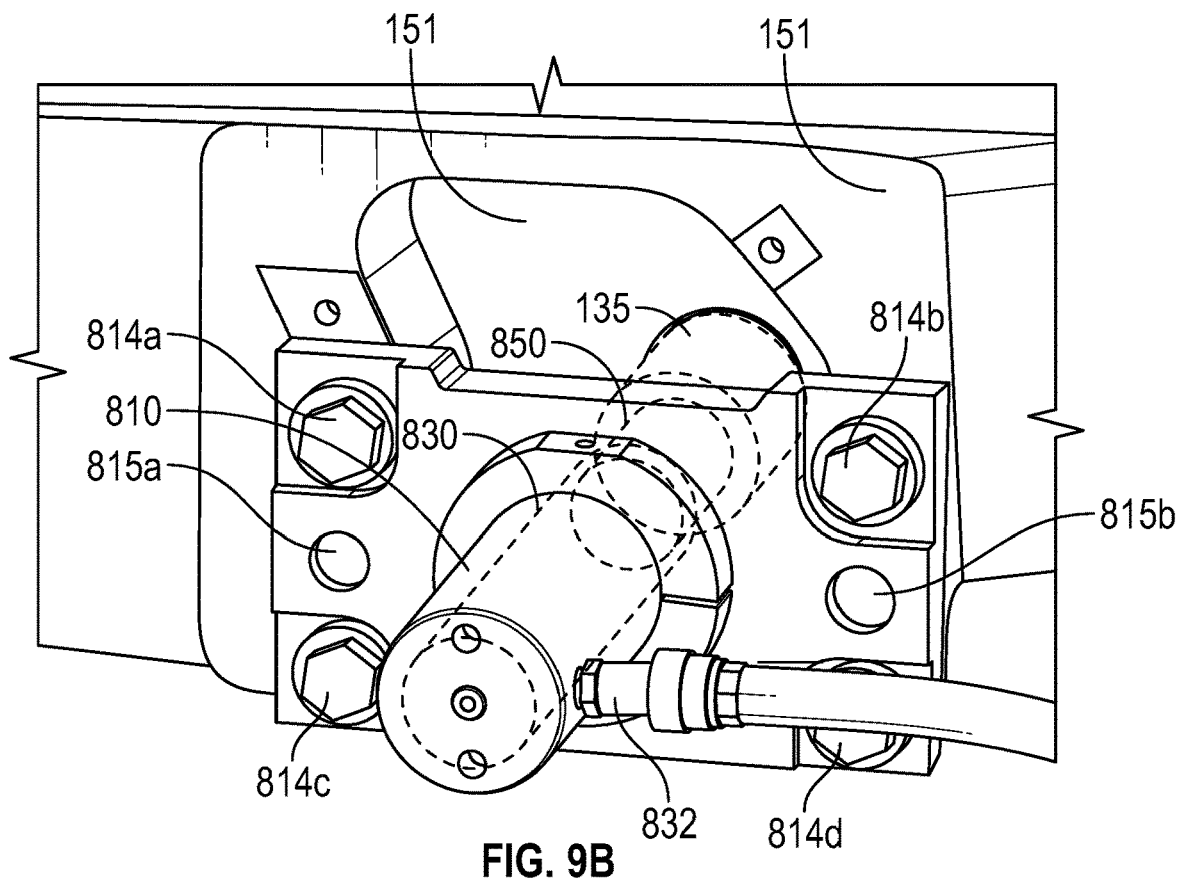
Figure 9C:
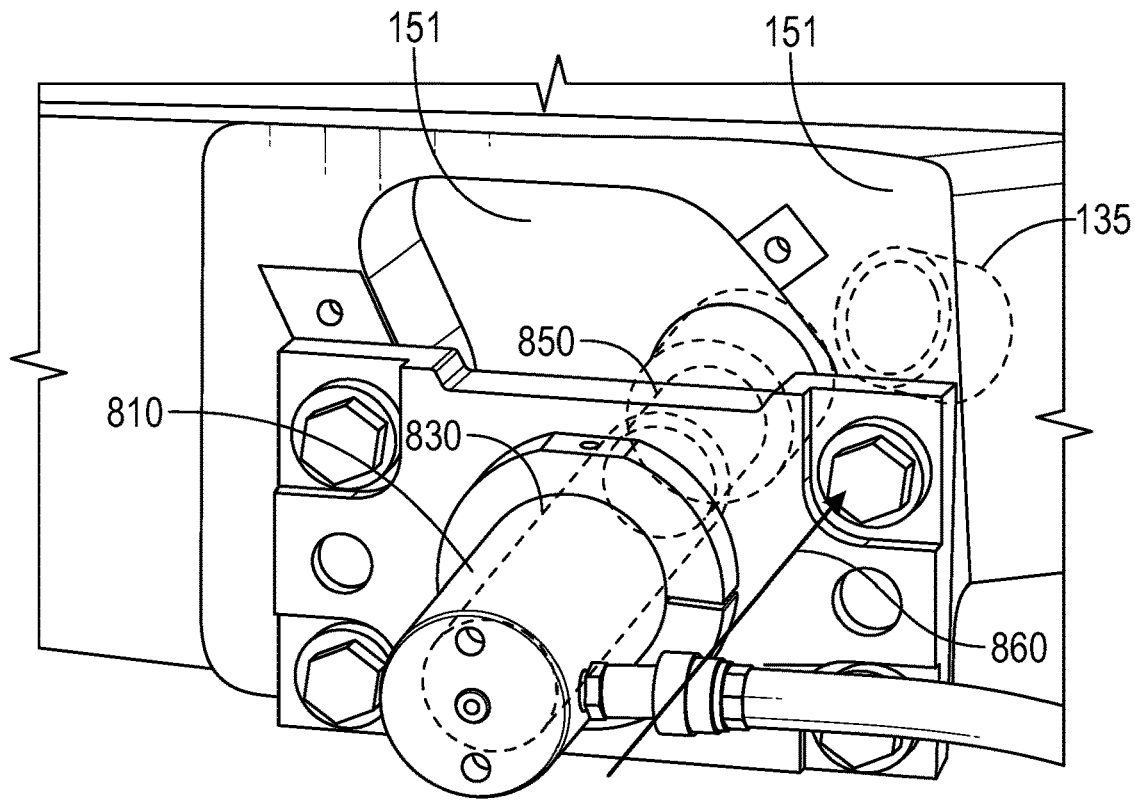

Operation of DWM bushing maintenance device 130 will now be discussed with reference to FIG. 14A, and with respect to FIGS. 9A-9C, in accordance with embodiments of the present disclosure. FIGS. 9A-9C show different views of DWM bushing maintenance device 130 during frame bushing removal operations in accordance with embodiments of the present disclosure. FIG. 14A shows a high-level flow diagram 1400 of operation of a DWM bushing maintenance device configured in accordance with embodiments of the present disclosure for removing a frame bushing from a frame of a DWM system installed in a truck assembly of a railroad vehicle.

As shown in FIG. 9A, which shows a DWM system after the DWM cover plate, the DWM main shaft, and the DWM chain crank have been removed (e.g., using DWM system cover plate removal device 110 and DWM crank and shaft removal device 120), frame bushing 135 may be installed within frame bushing opening in an interior surface of frame 151.

During operation, at block 1402, DWM bushing maintenance device 130 may be mounted onto an exterior surface of frame 151. In embodiments, as shown in FIG. 9B, mounting DWM bushing maintenance device 130 onto frame 151 may include positioning base 812 against frame 151, aligning base 812 with frame bushing 135 by inserting guide pins 815a and 815b in respective crew or bolt holes of frame 151. Each of one or more fasteners may be inserted through a respective one openings 814a-814d to secure base 812 onto frame 151. In embodiments, mounting DWM bushing maintenance device 130 onto frame 151 may include inserting the distal end of mandril 850 into frame bushing 135 until flange section 851 abuts frame bushing 135 and connecting the proximal end of mandril 850 to push driver 830.

In some embodiments, actuating medium source 832 may be attached to actuator 810. In embodiments, actuating medium source 832 may include a source that may provide a medium that actuator 810 may use to provide the pushing force. For example, actuating medium source 832 may include a hydraulic fluid source, an electrical source, a pneumatic source, etc., based on the type of actuator 810.

During operation, at block 1404, DWM bushing maintenance device 130 may be activated. Activating DWM bushing maintenance device 130 may include activating actuator 810 to provide the pushing force. In embodiments, actuator 810 may provide the pushing force by causing push driver 830 to be pushed in a direction towards frame 151 and to transfer the pushing force to mandril 850, which may push frame bushing 135 through frame bushing opening 910. For example, with reference to FIG. 9C, actuator 810 may cause push driver 830 to be pushed toward frame 151 in direction 860. The pushing force applied to push driver 830 may be transferred to mandrel 850, as mandrel 850 may be attached to push driver 830. As such, mandrel 850 may be pushed in direction 860, and as mandrel 850 may abut frame bushing 135, frame bushing 135 may be pushed in direction 860 into frame bushing opening 910. In this example, the flange section of mandrel 850 may be configured to pass through frame bushing opening 910. As such, as mandrel 850 pushes against frame bushing 135, frame bushing 135 may be pushed through the other side of frame bushing opening 910 and, in this manner, frame bushing 135 may be removed from frame bushing opening 910.

Figure 10A:
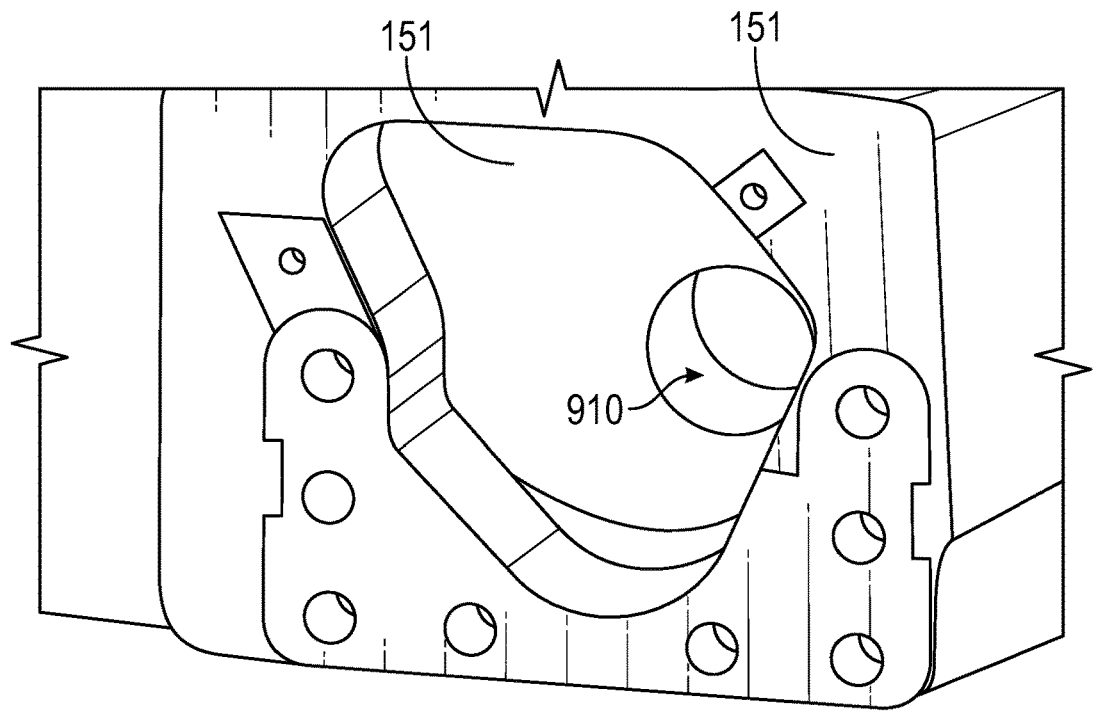
FIGS. 10A-10C show different views of a DWM bushing maintenance device during frame bushing installation operations in accordance with embodiments of the present disclosure.
Figure 10B:
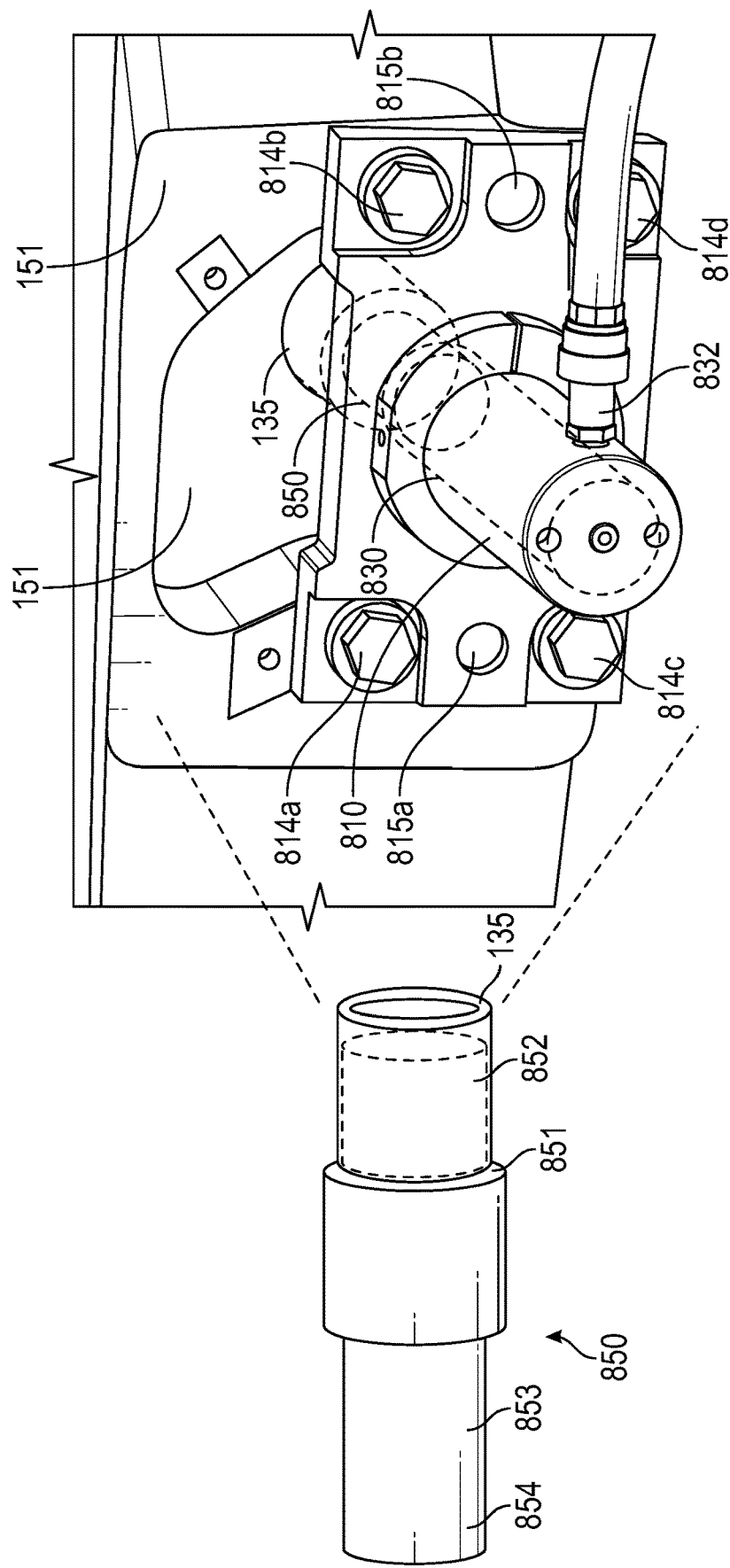
Figure 10C:
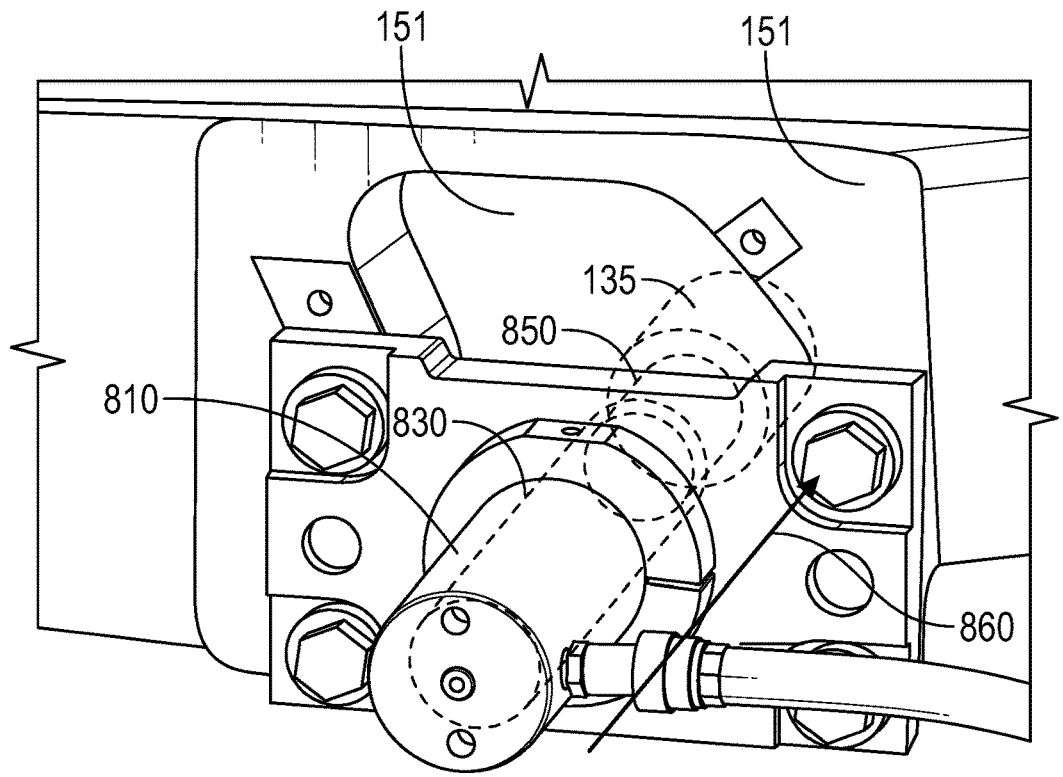

Operation of DWM bushing maintenance device 130 will now be discussed with reference to FIG. 14B, and with respect to FIGS. 10A-10C, in accordance with embodiments of the present disclosure. FIGS. 10A-10C show different views of DWM bushing maintenance device 130 during frame bushing installation operations in accordance with embodiments of the present disclosure. FIG. 14B shows a high-level flow diagram 1450 of operation of a DWM bushing maintenance device configured in accordance with embodiments of the present disclosure for installing a frame bushing into a frame of a DWM system installed in a truck assembly of a railroad vehicle.

As shown in FIG. 10A, which shows a DWM system with the DWM cover plate, the DWM main shaft, and the DWM chain crank removed, a frame bushing (e.g., frame bushing 135) is to be installed within frame bushing opening 910 in an interior surface of frame 151.

During operation, at block 1452, DWM bushing maintenance device 130 may be mounted onto an exterior surface of frame 151. In embodiments, as shown in FIG. 10B, mounting DWM bushing maintenance device 130 onto frame 151 may include positioning base 812 against frame 151, aligning base 812 with frame bushing opening 910 by inserting guide pins 815a and 815b in respective crew or bolt holes of frame 151. Each of one or more fasteners may be inserted through a respective one openings 814a-814d to secure base 812 onto frame 151. In embodiments, mounting DWM bushing maintenance device 130 onto frame 151 may include inserting frame bushing 135 onto the distal end 852 of mandril 850, such that frame bushing 135 abuts the side of flange section 851. In embodiments, proximal end 854 of mandril 850 may be connected to push driver 830.

In some embodiments, actuating medium source 832 may be attached to actuator 810. In embodiments, actuating medium source 832 may include a source that may provide a medium that actuator 810 may use to provide the pushing force. For example, actuating medium source 832 may include a hydraulic fluid source, an electrical source, a pneumatic source, etc., based on the type of actuator 810.

During operation, at block 1545, DWM bushing maintenance device 130 may be activated. Activating DWM bushing maintenance device 130 may include activating actuator 810 to provide a pushing force. In embodiments, actuator 810 may provide the pushing force by causing push driver 830 to be pushed in a direction towards frame 151 and to transfer the pushing force to mandril 850, which may push frame bushing 135 into frame bushing opening 910. For example, with reference to FIG. 10C, actuator 810 may cause push driver 830 to be pushed toward frame 151 in direction 860. The pushing force applied to push driver 830 may be transferred to mandrel 850, as mandrel 850 may be attached to push driver 830. As such, mandrel 850 may be pushed in direction 860, and as mandrel 850 may abut frame bushing 135, frame bushing 135 may be pushed in direction 860 into frame bushing opening 910. In this example, the flange section of mandrel 850 may be configured to be prevented from passing through frame bushing opening 910. For example, the flange section of mandrel 850 may have a larger cross-sectional diameter than the diameter of frame bushing opening 910 such that the flange section of mandril 850 may pressed against the interior surface of frame 151 without passing into frame bushing opening 910 and, in this manner, the flange section of mandrel 850 may be flushed against frame 151 ensuring that frame bushing 135 is installed aligned within frame bushing opening 910.

Figure 11A:
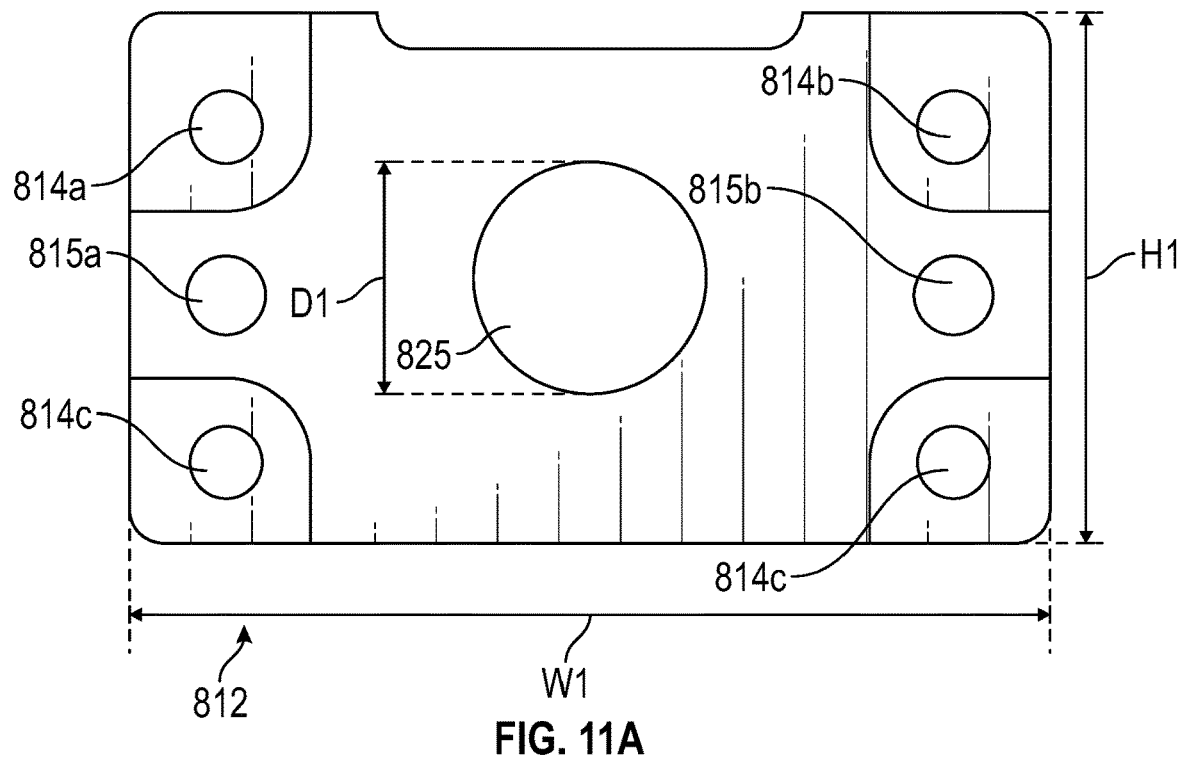
FIGS. 11A-11C show examples of configuration for various components of a DWM bushing maintenance device configured in accordance with embodiments of the present disclosure.
Figure 11B:
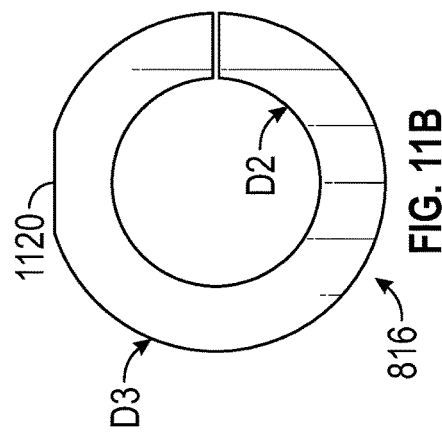
Figure 11C:
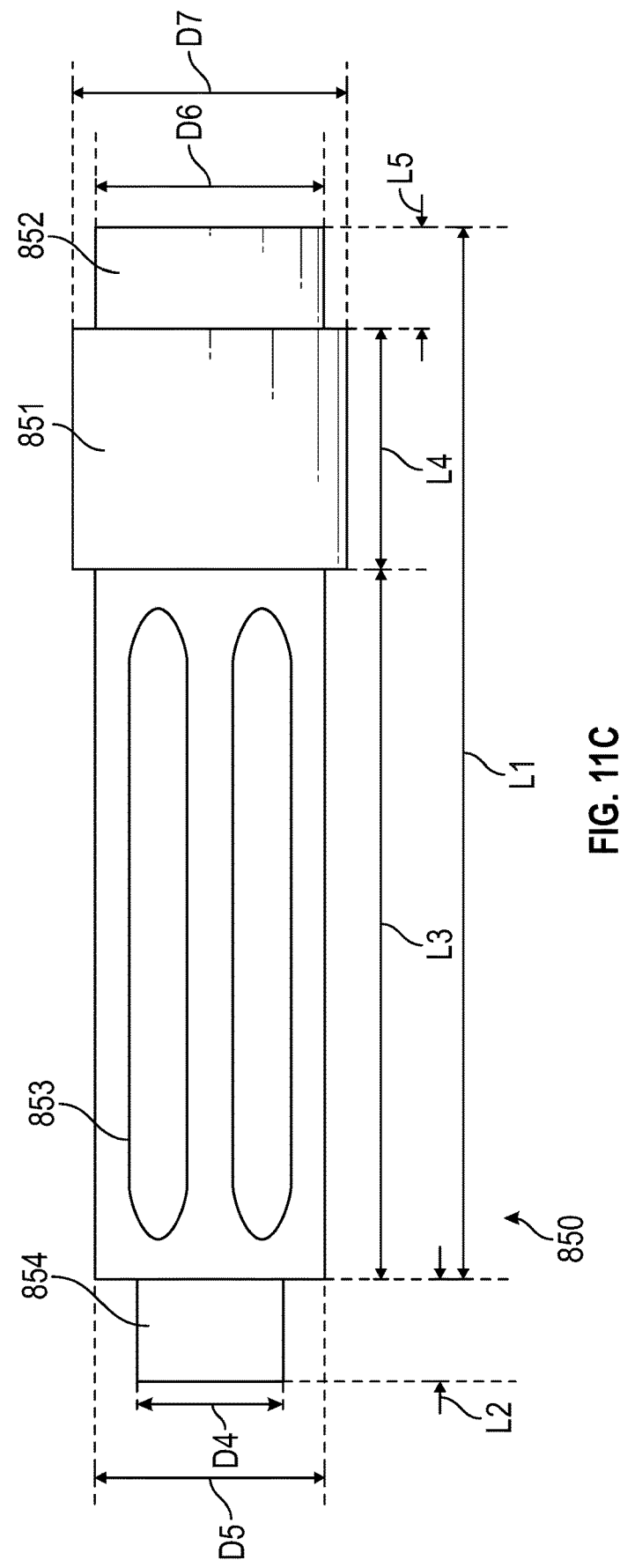
Figure 17:
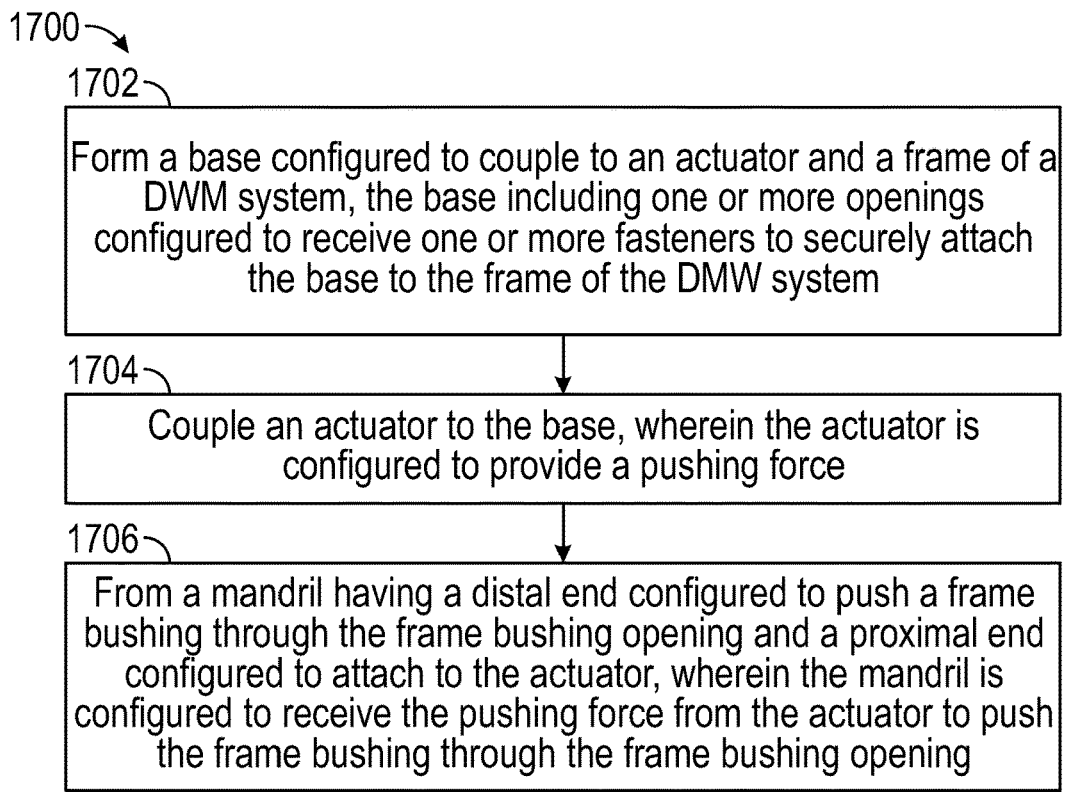
FIG. 17 shows an exemplary flow diagram of operations for manufacturing a DWM bushing maintenance device configured with functionality for removing a frame bushing from a DWM system installed in a truck assembly of a railroad vehicle in accordance with embodiments of the present disclosure.

A method of manufacturing a DWM bushing maintenance device will now be discussed with respect to FIG. 17, and with respect to FIGS. 11A-11C, in accordance with embodiments of the present disclosure. FIGS. 11A-11C show examples of configuration for various components of a DWM bushing maintenance device configured in accordance with embodiments of the present disclosure. FIG. 17 shows an exemplary flow diagram of operations for manufacturing a DWM bushing maintenance device configured with functionality for removing a frame bushing from a DWM system installed in a truck assembly of a railroad vehicle in accordance with embodiments of the present disclosure. For example, the steps illustrated in the example blocks shown in FIG. 17 may be performed to manufacture DWM bushing maintenance device 130 of FIGS. 1A, 1C, and 8A-10C, according to embodiments herein.

At block 1702, a base may be formed. For example, with reference to FIG. 11A, base 512 may be formed with a generally rectangular shape having a width 1 ranging from 10 to 16 inches and a height H1 ranging from 3 to 8 inches. In embodiments, base 812 may include central opening 825. In central opening may have a diameter D1 ranging from 2 to 5 inches.

In embodiments, base 812 may be configured to attach to a frame of a DWM system. For example, base 812 may include one or more openings (e.g., openings 814a-814d) configured to receive one or more fasteners to securely attach base 812 to the frame of the DWM system. In embodiments, one or more guide pins (e.g., guide pins 815a and 815b) may be attached to base 812.

In embodiments, base 812 may be configured to attach to an actuator. For example, at block 1704, a collar may be formed. In embodiments, the collar may be configured to couple base 812 to the actuator. For example, the collar may wrap around the actuator and a side of base 812. In this manner, the collar may couple base 812 to actuator 810. FIG. 11B shows an example configuration of a collar in accordance with embodiments of the present disclosure. As shown in FIG. 11B, collar 816 may be formed with a ring shape having an internal diameter D2 ranging from 2 to 5 inches and an external diameter D3 ranging from 4 to 7 inches. In embodiments, collar 816 may be formed as a broken allowing collar 816 to open to facilitate being positioned around actuator 810. In some embodiments, collar 816 may be configured with a flat section 1120. In embodiments, flat section 1120 may be configured to receive a lifting element (e.g., lifting element 818 in FIG. 8A) configured to allow or facilitate lifting (e.g., using a powered lifting mechanism) of DWM bushing maintenance device 130 during operation.

At block 1704, the actuator may be coupled to the base. In embodiments, the actuator may be configured to provide a pushing force. At block 1706, a mandril may be formed. In embodiments, the mandril may be configured with a distal end configured to push the frame bushing through the frame bushing opening and a proximal end configured to attach to the push driver connected to the actuator. As described above, the configuration of the mandril may be based on whether the mandril is to be used for removing the frame bushing from the frame bushing opening or for installing the frame bushing into the frame bushing opening. FIG. 11C illustrates an example configuration of a mandril configured in accordance with embodiments of the present disclosure. As shown in FIG. 11C, mandril 850 may include main shaft 853, flange section 851, and holding section 852. In embodiments, mandril 850 may have a length L1 ranging from 10 to 13 inches. The main shaft 853 may have a generally circular cross-section with a diameter D5 ranging from 1.5 to 3 inches. In embodiments, main shaft 853 may be configured with distal end 854 configured to attach to a push driver. Distal end may have a generally circular cross-section with a diameter D4 ranging from 1 to 2 inches and a length L2 ranging from 0.5 to 1.5 inches.

In embodiments, the dimensions of flange section 851 and holding section 852 may be based on whether the mandril is to be used for removing the frame bushing from the frame bushing opening or for installing the frame bushing into the frame bushing opening. For example, in applications where mandril 850 may be used to remove a frame bushing from a frame bushing opening, flange section 851 may have a generally circular cross-section with a diameter D7 ranging from 2 to 3.5 inches and a length L4 ranging from 1.5 to 3 inches, and holding section 852 may have a generally circular cross-section with a diameter D6 ranging from 1.5 to 3 inches and a length L5 ranging from 0.5 to 1.5 inches. In applications where mandril 850 may be used to install a frame bushing into a frame bushing opening, flange section 851 may have a generally circular cross-section with a diameter D7 ranging from 2.5 to 3.5 inches and a length L4 ranging from 1.2 to 2.2 inches, and holding section 852 may have a generally circular cross-section with a diameter D6 ranging from 1.7 to 3 inches and a length L5 ranging from 0.5 to 1 inch.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A dynamic weight management (DWM) system cover plate removal tool, comprising:
    an actuator configured to provide a driving force;
    a base coupled to the actuator, wherein the base has one or more key openings configured to receive one or more keys to secure the base to a cover plate of a DWM system attached to a frame of a truck assembly of a railroad vehicle, wherein the base defines a central opening configured to receive a main shaft of the DWM system such that the main shaft of the DWM system is surrounded by the central opening when the main shaft of the DWM system is inserted into the central opening;

at least one mandril disposed within the central opening of the base configured to:
  contact, at a distal end of the at least one mandril, the main shaft of the DWM system; and
  receive, at a proximal end of the at least one mandril, the driving force from the actuator, wherein the driving force from the actuator causes the at least one mandril to push against the main shaft of the DWM system in a first direction and the base to pull from the main shaft of the DWM system in a second direction opposite the first direction causing the cover plate to separate from the frame of the truck assembly.

2. The DWM system cover plate removal tool of claim 1, wherein the actuator includes one or more of:
  a hydraulic ram;
  a pneumatic actuator;
  an electromechanical actuator; and
  an electromagnetic actuator.

3. The DWM system cover plate removal tool of claim 1, wherein the base includes a section configured to align with a chain crank of the DWM system.

4. The DWM system cover plate removal tool of claim 1, wherein the one or more key openings are configured to secure the base to an opening of the cover plate through which the main shaft of the DWM system is disposed during operation of the DWM system.

5. The DWM system cover plate removal tool of claim 1, wherein the base is configured to facilitate lifting of the DWM system cover plate removal tool.

6. The DWM system cover plate removal tool of claim 1, wherein the at least one mandril includes a first mandril configured to push against the main shaft of the DWM system in the first direction and the base to pull from the main shaft of the DWM system in the second direction opposite the first direction causing the cover plate to separate from the frame of the truck assembly and travel through the main shaft of the DWM system in the second direction to a point less than an end of the main shaft of the DWM system.

7. The DWM system cover plate removal tool of claim 6, wherein the at least one mandril is replaceable with another mandril having a longer length than the at least one mandril, wherein replacing the at least one mandril with the another mandril having the longer length includes removing the at least one mandril form the central opening of the base and disposing the another mandril having the longer length within the central opening of the base, wherein the another mandril having the longer length is configured to push against the main shaft of the DWM system in the first direction and the base to pull from the main shaft of the DWM system in the second direction opposite the first direction causing the cover plate to separate from the frame of the truck assembly in the second direction and to completely separate from the main shaft of the DWM system.

8. A method of removing a cover plate of a dynamic weight management (DWM) system, comprising:
  mounting a removal device onto the cover plate of the DWM system attached to a frame of a truck assembly of a railroad vehicle, the removal device including:
    an actuator configured to provide a driving force;
    a base coupled to the actuator, wherein the base has one or more key openings configured to receive one or more keys to secure the base to the cover plate of the DWM system, wherein the base defines a central opening configured to receive a main shaft of the DWM system such that the main shaft of the DWM system is surrounded by the central opening when the main shaft of the DWM system is inserted into the central opening;
    at least one mandril disposed within the central opening of the base configured to:
      contact, at a distal end of the at least one mandril, the main shaft of the DWM system; and
      receive, at a proximal end of the at least one mandril, the driving force from the actuator; and
  activating the removal device, wherein activating the removal device causes the actuator to apply the driving force to cause the at least one mandril to push against the main shaft of the DWM system in a first direction and the base to pull from the main shaft of the DWM system in a second direction opposite the first direction causing the cover plate to separate from the frame of the truck assembly.

9. The method of claim 8, wherein the actuator includes one or more of:
  a hydraulic ram;
  a pneumatic actuator;
  an electromechanical actuator; and
  an electromagnetic actuator.

10. The method of claim 8, wherein the base includes a section configured to align with a chain crank of the DWM system.

11. The method of claim 8, wherein the one or more key openings are configured to secure the base to an opening of the cover plate through which the main shaft of the DWM system is disposed during operation of the DWM system.

12. The method of claim 8, wherein the base is configured to facilitate lifting of the removal device.

13. The method of claim 8, wherein the at least one mandril includes a first mandril configured to push against the main shaft of the DWM system in the first direction and the base to pull from the main shaft of the DWM system in the second direction opposite the first direction causing the cover plate to separate from the frame of the truck assembly and travel through the main shaft of the DWM system in the second direction to a point less than an end of the main shaft of the DWM system.

14. The method of claim 13, wherein the at least one mandril is replaceable with another mandril having a longer length than the at least one mandril, wherein replacing the at least one mandril with the another mandril having the longer length includes removing the at least one mandril form the central opening of the base and disposing the another mandril having the longer length within the central opening of the base, wherein the another mandril having the longer length is configured to push against the main shaft of the DWM system in the first direction and the base to pull from the main shaft of the DWM system in the second direction opposite the first direction causing the cover plate to separate from the frame of the truck assembly in the second direction and to completely separate from the main shaft of the DWM system.

* * * * *